US012670175B2

(12) United States Patent
Alli et al.

(10) Patent No.: US 12,670,175 B2
(45) Date of Patent: Jun. 30, 2026

(54) MAPPING DATA-SERIALIZATION ELEMENTS BETWEEN A SOURCE AND A DESTINATION

(71) Applicant: Oracle International Corporation, Redwood Shores, CA (US)

(72) Inventors: Sunitha Alli, Centennial, CO (US); Thomas Hora, Parker, CO (US)

(73) Assignee: Oracle International Corporation, Redwood Shores, CA (US)

( * ) Notice: Subject to any disclaimer, the term of this patent is extended or adjusted under 35 U.S.C. 154(b) by 68 days.

(21) Appl. No.: 18/342,367

(22) Filed: Jun. 27, 2023

(65) Prior Publication Data

US 2025/0005035 A1 Jan. 2, 2025

(51) Int. Cl.
G06F 16/25 (2019.01)
G06F 9/451 (2018.01)

(52) U.S. Cl.
CPC ............ G06F 16/258 (2019.01); G06F 9/451 (2018.02)

(58) Field of Classification Search
CPC ........ G06F 16/258; G06F 9/451; G06F 16/84; G06F 8/34
USPC ................................. 707/756, 802, 803, 805
See application file for complete search history.

(56) References Cited

U.S. PATENT DOCUMENTS

| | | | |
|---|---|---|---|
| 10,402,380 B1 | 9/2019 | Carr et al. | |
| 2005/0015732 A1* | 1/2005 | Vedula | G06F 8/34 |
| | | | 719/329 |
| 2005/0138057 A1* | 6/2005 | Bender | G06F 9/451 |
| | | | 707/999.102 |
| 2006/0156314 A1* | 7/2006 | Waldorf | G06F 9/4484 |
| | | | 712/E9.082 |
| 2007/0179962 A1* | 8/2007 | Hernandez-Sherrington | |
| | | | G06F 40/117 |
| | | | 707/999.101 |
| 2016/0019196 A1 | 1/2016 | Birdeau | |
| 2016/0321307 A1* | 11/2016 | Dingman | G06F 16/25 |
| 2018/0278725 A1* | 9/2018 | Thayer | H04L 69/22 |

(Continued)

OTHER PUBLICATIONS

"JSON to JSON transformation library written in Java", Retrieved from https://github.com/bazaarvoice/jolt, May 26, 2023, pp. 7.

(Continued)

*Primary Examiner* — Phong H Nguyen
(74) *Attorney, Agent, or Firm* — Invoke

(57) ABSTRACT

A system may display a Graphical User Interface including a source region presenting a plurality of source data-serialization elements and a destination region presenting a plurality of destination data-serialization elements. The system may receive a user input associating a first destination data-serialization element, of the plurality of destination data-serialization elements, and a first source data-serialization element of the plurality of source data-serialization elements. Responsive to receiving the user input, the system may generate and store a mapping expression that defines a mapping association between the first source data-serialization element and the first destination data-serialization element. The system may present in a mapping region of the GUI displayed concurrently with the source region and the destination region, a mapping element representing the mapping association between the first source data-serialization element and the first destination data-serialization element.

44 Claims, 23 Drawing Sheets

(56) References Cited

U.S. PATENT DOCUMENTS

2021/0294828 A1 * 9/2021 Tomkins ................ G06F 9/547

OTHER PUBLICATIONS

"JSON transformations and queries," 2023, pp. 5.
"Mapping and transforming application data and JSON", Jan. 10, 2023, pp. 3.
"Stylus Studio XML Mapper Screenshot," 2023, pp. 2.
"XML Data Mapping," Healthcare, 2023, pp. 6.
"XSLT Mapper," 2023, pp. 4.

* cited by examiner

200 concurrently display in a Graphical User Interface (GUI), a first region presenting first data-serialization elements, a second region presenting second data-serialization elements, and a mapping region presenting mapping elements corresponding to mapping associations between first data-serialization elements and second data-serialization elements

220 receive a first user input generating or identifying a first data-serialization element associated with a first serialized data corpus for inclusion in a mapping association

222 present in the mapping region of the GUI, (a) a mapping element representing the mapping association including the first data-serialization element, and (b) a mapping selection element for identifying at a second data-serialization element associated with a second serialized data corpus for inclusion in the mapping association

224 receive a second user input generating or identifying a second data-serialization element associated with the second serialized data corpus for inclusion in the mapping association

226

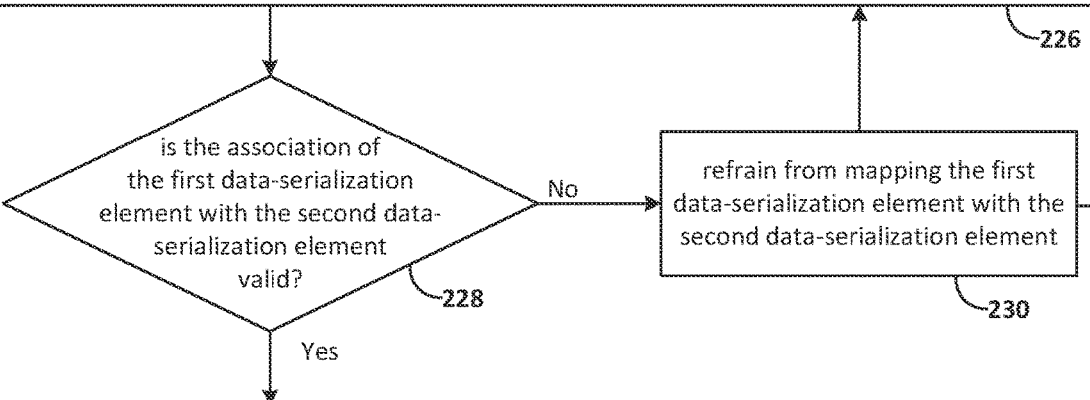

is the association of the first data-serialization element with the second data-serialization element valid?

228

No refrain from mapping the first data-serialization element with the second data-serialization element

230

Yes present in the second region of the GUI, the second data-serialization, and presenting in the mapping region of the GUI, the mapping association between the first data-serialization element and the second data-serialization element

232 generate and store a mapping expression that defines a mapping association between the first data-serialization element and the second data-serialization element

```
┌────────────────────────────────────────────────────────────────────┐
│ concurrently display in a Graphical User Interface (GUI), a source   │
│ region presenting source data-serialization elements, a destination │
│ region presenting destination data-serialization elements, and a    │
│ mapping region presenting mapping elements corresponding to mapping  │
│ associations between source data-serialization elements and          │
│ destination data-serialization elements                             │
└────────────────────────────────────────────────────────────────────┘
                                                           240
                              │
                              ▼
┌────────────────────────────────────────────────────────────────────┐
│ receive a user input updating a source value of a source            │
│ data-serialization element with an updated source value             │
└────────────────────────────────────────────────────────────────────┘
                                                           242
                              │
                              ▼
┌────────────────────────────────────────────────────────────────────┐
│ determine a mapping expression that defines a mapping association   │
│ between the source data-serialization element and a destination     │
│ data-serialization element                                          │
└────────────────────────────────────────────────────────────────────┘
                                                           244
                              │
                              ▼
┌────────────────────────────────────────────────────────────────────┐
│ compute, based on the first mapping expression, an updated          │
│ destination value of the destination data-serialization element     │
└────────────────────────────────────────────────────────────────────┘
                                                           246
                              │
                              ▼
           ◇ are the updated source          No    ┌──────────────────────┐
             value and the updated      ─────────▶ │ refrain from updating │
             destination value valid? ◇            │ the source value with │
                    248                            │ the updated source    │
                    │ Yes                          │ value                 │
                    ▼                              └──────────────────────┘
                                                           250
┌────────────────────────────────────────────────────────────────────┐
│ update the source value with the updated source value, and update   │
│ the destination value with the updated destination value            │
└────────────────────────────────────────────────────────────────────┘
                                                           252
                              │
                              ▼
┌────────────────────────────────────────────────────────────────────┐
│ present in the source region of the GUI, the source value being     │
│ updated with the updated source value                               │
└────────────────────────────────────────────────────────────────────┘
                                                           254
                              │
                              ▼
┌────────────────────────────────────────────────────────────────────┐
│ present in the destination region of the GUI, concurrently with the │
│ updated source value being presented in the source region of the    │
│ GUI, the destination value of the destination data-serialization    │
│ element being updated with the updated destination value            │
└────────────────────────────────────────────────────────────────────┘
                                                           256
```

FIG. 2C

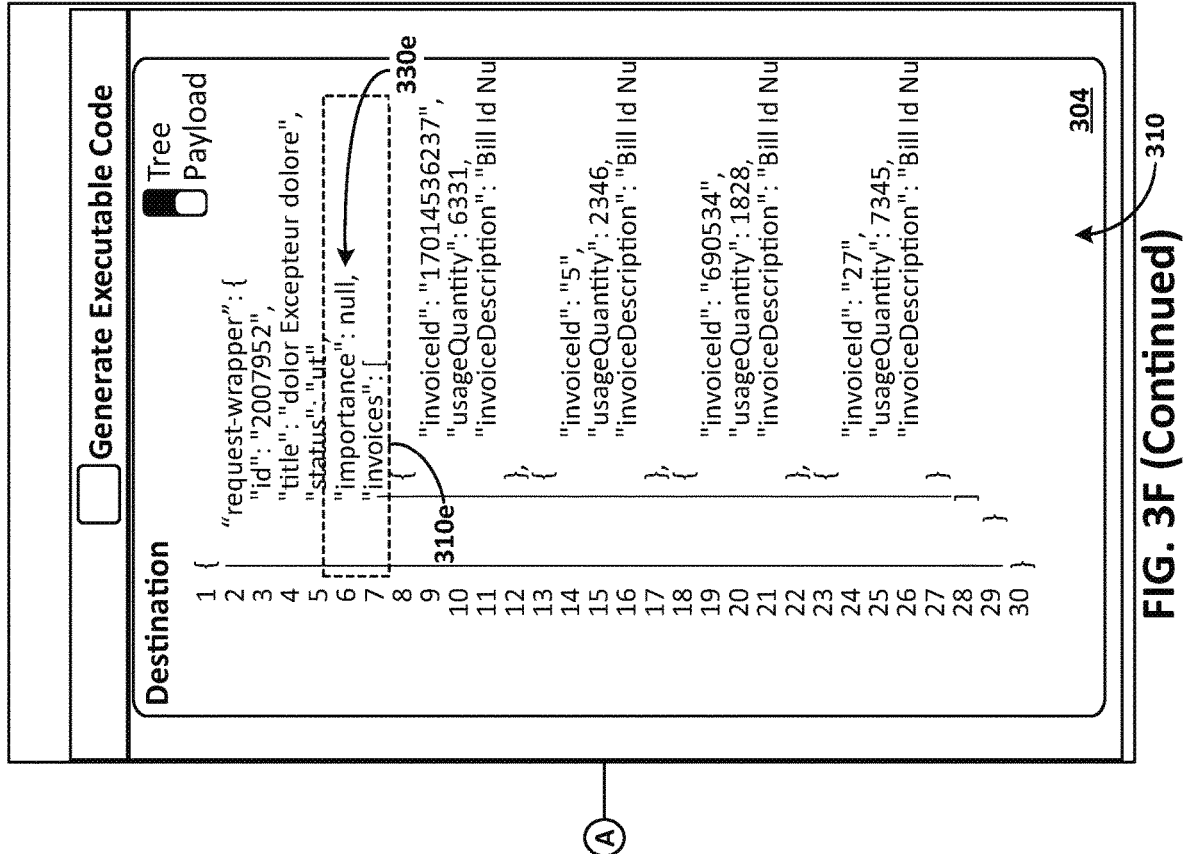

```
Destination                    Generate Executable Code
                               Tree
                               Payload 1   {
2     "request-wrapper": {
3       "id": "2007952",
4       "title": "dolor Excepteur dolore",
5       "status": "ut"
6       "importance": null,          330e
7       "invoices": [
8       {
9         "invoiceId": "1701453623 7",
10        "usageQuantity": 6331,
11        "invoiceDescription": "Bill Id Nu
12      },
13      {
14        "invoiceId": "5",
15        "usageQuantity": 2346,
16        "invoiceDescription": "Bill Id Nu
17      },
18      {
19        "invoiceId": "690534",
20        "usageQuantity": 1828,
21        "invoiceDescription": "Bill Id Nu
22      },
23      {
24        "invoiceId": "27",
25        "usageQuantity": 7345,
26        "invoiceDescription": "Bill Id Nu
27      }
28      ]
29    }
30  }
                                              304
```

MAPPING DATA-SERIALIZATION ELEMENTS BETWEEN A SOURCE AND A DESTINATION

TECHNICAL FIELD

The present disclosure relates to mapping data-serialization elements between a source and a destination.

BACKGROUND

Serialization formats or data interchange formats may be used to represent structured data in a standardized way, allowing for transmission, storage, and consumption by different systems and programming languages. The structured data in connection with a serialization format or data interchange format may be represented by data-serialization elements. The structured data may be transferred from a source to a destination by mapping data serialization elements associated with the destination to data serialization elements associated with the source.

The content of this background section should not be construed as prior art merely by virtue of its presence in this section.

BRIEF DESCRIPTION OF THE DRAWINGS

The embodiments are shown by way of example and not by way of limitation in the figures of the accompanying drawings. It should be noted that references to "an" or "one" embodiment in this disclosure are not necessarily to the same embodiment, and they mean at least one. In the drawings:

FIG. 2B illustrates example operations that may be performed by the system, including operations associated with generating data-serialization elements for inclusion in mapping expressions, in accordance with one or more embodiments;

FIG. 2C illustrates example operations that may be performed by the system, including operations associated with updating values for data-serialization elements and displaying updated values computed from mapping expressions that define mapping associations between the data-serialization elements with updated values, in accordance with one or more embodiments;

DETAILED DESCRIPTION

Figure 1A:
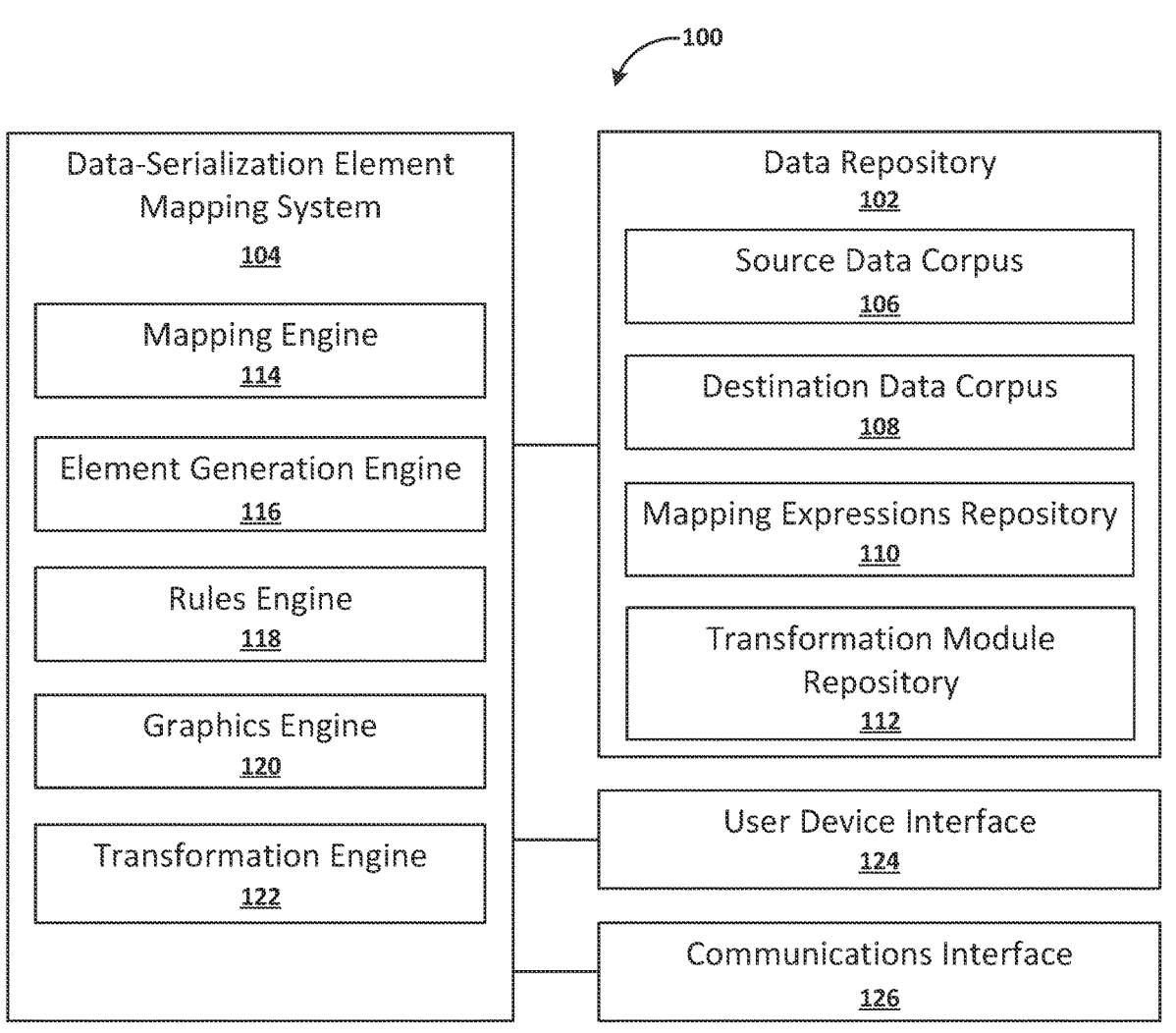
FIG. 1A illustrates an example system that includes a data repository and a data-serialization element management system in accordance with one or more embodiments.

In the following description, for the purposes of explanation, numerous specific details are set forth in order to provide a thorough understanding. Detailed examples are described below for purposes of clarity. One or more embodiments may be practiced without these specific details. Components and/or operations described below should be understood as one specific example which may not be applicable to certain embodiments. Features described in one embodiment may be combined with features described in a different embodiment. In some examples, well-known structures and devices are described with reference to a block diagram form in order to avoid unnecessarily obscuring the present invention. Components and/or operations described below should not be construed as limiting the scope of any of the claims.

1. GENERAL OVERVIEW
2. SERIALIZED DATA MANAGEMENT SYSTEM
3. EXAMPLE MAPPING OPERATIONS
4. EXAMPLE FEATURES OF A DATA-SERIALIZATION ELEMENT MAPPING INTERFACE
5. PRACTICAL APPLICATIONS, ADVANTAGES & IMPROVEMENTS
6. COMPUTER NETWORKS AND CLOUD NETWORKS
7. MICROSERVICE APPLICATIONS
8. HARDWARE OVERVIEW
9. MISCELLANEOUS; EXTENSIONS

1. General Overview

One or more embodiments generate mapping expressions that define mapping associations between destination data-serialization elements and source data-serialization elements. The system may generate a Graphical User Interface (GUI) that accept user inputs selecting mapping associations. The system may generate the mapping expressions responsive to the user inputs via the GUI.

The GUI may concurrently display a source region presenting source data-serialization elements, a destination region presenting destination data-serialization elements, and a mapping region presenting mapping elements that represent mapping expressions that define a mapping association between source data-serialization elements and destination data-serialization elements. The system may receive user input selecting a source data-serialization element and a destination data-serialization element to be mapped with one another. Responsive to receiving the user input, the system may generate and store a mapping expression that defines a mapping association between the source data-serialization element and the destination data-serialization element. Further, the mapping region of the GUI may present a mapping element representing the mapping association between the first source data-serialization element and the first destination data-serialization element.

The GUI may visually display the mapping association including the respective data serialization elements and how they are mapped to one another. In one example, the GUI may be utilized to map a source payload that includes multiple source data-serialization elements to a destination payload that includes multiple destination data-serialization elements. The GUI may include interface elements that allow for the generation and validation of mapping associations between various data-serialization elements in the respective payloads.

In one example, the system may generate executable code that encodes one or more mapping expressions. The executable code may be utilized to transform a source payload to a destination payload based on mapping expressions generated responsive to the mapping associations indicated by the user inputs via the GUI. The executable code may be utilized to perform a transformation process upon a set of source payloads. The transformations may be performed in a batch process or a periodic process, for example, when transferring batches of payloads from a source computing system to a destination computing system. Additionally, or in the alternative, the transformations may be performed on an as-available basis, such as when a new source payload becomes available at a source computing system and is to be transferred to a destination computing system. The transformation process may include transforming source payloads to destination payload, and/or transferring source data values corresponding to source payloads to respective locations in destination payloads. The executable code may be run on an integration server that transforms incoming source payloads into outgoing destination payloads.

This General Overview section is intended to provide a general overview without addressing all aspects of the present disclosure. The full scope of the presently disclosed subject matter is understood from the content of the present disclosure in its entirety.

2. Serialized Data Management System

Referring now to FIGS. 1A-1E, example systems are described. As shown in FIG. 1A, a system 100 in accordance with one or more embodiments may include a data repository 102 and a data-serialization element mapping system 104 communicatively coupled or couplable with one another. The data repository 102 may include data utilized and/or stored by the data-serialization element mapping system 104 in association with various operations. The data-serialization element mapping system 104 may include hardware and/or software configured to carry out the various operations. The various operations may include operations associated with mapping data-serialization elements with one another. Example operations are further described below with reference to FIGS. 2A-2C, and 3A-3I. In one or more embodiments, the system 100 may include more or fewer components than the components described with reference to FIGS. 1A-1E. The components described with reference to FIGS. 1A-1E may be local to or remote from each other. The components described with reference to FIGS. 1A-1E may be implemented in software and/or hardware. Each component may be distributed over multiple applications and/or machines. Multiple components may be combined into one application and/or machine. Operations described with respect to one component may instead be performed by another component.

A. Data Repository Features.

In one or more embodiments, a data repository 102 may include any type of storage unit and/or device (e.g., a file system, database, collection of tables, or any other storage mechanism) for storing data. Further, a data repository 102 may include multiple different storage units and/or devices. The multiple different storage units and/or devices may or may not be of the same type or located at the same physical site. Further, a data repository 102 may be implemented or executed on the same computing system as the data-serialization element mapping system 104. Additionally, or in the alternative, a data repository 102 may be implemented or executed on a computing system separate from the data-serialization element mapping system 104. The data repository 102 may be communicatively coupled to the data-serialization element mapping system 104 via a direct connection or via a network.

As shown in FIG. 1A, a data repository 102 may include a source data corpus 106 and/or a destination data corpus 108. The source data corpus 106 may include one or more sets of source data-serialization elements. Additionally, or in the alternative, the source data corpus 106 may include one or more source datasets. The one or more source datasets may be associated with the source data-serialization elements. For example, the source data corpus 106 may include one or more source payloads. A source payload may include a set of source data-serialization elements and data values corresponding to the respective source data-serialization elements in the set. Various data items in the source data corpus 106 (e.g., source data-serialization elements, source datasets, and/or source payloads) may be associated with a source that may transmit various data items to a destination. The source data corpus 106 may include multiple sets of source data-serialization elements, source datasets, and/or source payloads respectively associated with a different source.

The destination data corpus 108 may include one or more sets of destination data-serialization elements. Additionally, or in the alternative, the destination data corpus 108 may include one or more destination datasets. The one or more destination datasets may be associated with the destination data-serialization elements. For example, the destination data corpus 108 may include one or more destination payloads. A destination payload may include a set of destination data-serialization elements and data values corresponding to the respective destination data-serialization elements in the set. Various data items in the destination data corpus 108 (e.g., destination data-serialization elements destination datasets, and/or destination payloads) may be associated with a destination that may receive various data items from a source. The destination data corpus 108 may include multiple sets of destination data-serialization elements, destination datasets, and/or destination payloads respectively associated with a different destination.

The data repository 102 may further include a mapping expressions repository 110. The mapping expressions repository 110 may include one or more sets of mapping expressions. A mapping expression may define a mapping association between one or more source data-serialization elements and one or more destination data-serialization elements. The mapping association may be utilized to transform a source payload that includes one or more source data-serialization element and a corresponding source dataset to a destination payload that includes one or more destination data-serialization elements and a corresponding destination dataset. Additionally, or in the alternative, the mapping association may be utilized to perform a transformation in reverse, from a destination payload that includes one or more destination data-serialization element and a corresponding destination dataset to a source payload that includes one or more source data-serialization elements and a corresponding source dataset. The mapping expressions in the mapping expressions repository 110 may include pre-existing expressions and/or expressions generated by the data-serialization element mapping system 104. The mapping associations defined by a mapping expression may pertain to one or more sources, and/or one or more destinations. For example, a mapping expression may include a mapping association corresponding to one source and one destination, one source and multiple destinations, or multiple sources and one destination.

The data repository 102 may further include a transformation module repository 112. The transformation module repository 112 may include one or more sets of transformation modules. A transformation module may include executable code that encodes a set of mapping expressions configured to transform a source payload to a destination payload based on one or more mapping expressions that define mapping associations between source data-serialization elements corresponding to the source payload and destination data-serialization elements corresponding to the destination payload. Additionally, or in the alternative, a transformation module may include executable code that encodes a set of mapping expressions configured to transfer source data values corresponding to a source payload to respective locations in a destination payload based on the one or more mapping expressions. Additionally, or in the alternative, the transformation modules may include executable code configured to perform a transformation in reverse, from a destination payload that includes one or more destination data-serialization element and a corresponding destination dataset to a source payload that includes one or more source data-serialization elements and a corresponding source dataset. The transformation modules in the transformation module repository 112 may include pre-existing transformation modules and/or transformation modules generated by the data-serialization element mapping system 104. The transformation modules may pertain to one or more sources, and/or one or more destinations. For example, a transformation modules may include executable code that mapping expressions corresponding to one source and one destination, one source and multiple destinations, or multiple sources and one destination.

As used herein, the term "source" refers to a computing system that may transfer data items (e.g., payloads, data-serialization elements, and/or datasets associated with data-serialization elements) to a destination in accordance with one or more mapping expressions and/or transformation modules. A computing system associated with a source may sometimes be referred to as a source computing system. As used herein, the term "destination" refers to a computing system that may receive data items (e.g., payloads, data-serialization elements, and/or datasets associated with data-serialization elements) from a source in accordance with one or more mapping expressions and/or transformation modules. A computing system associated with a destination may sometimes be referred to as a destination computing system.

As examples, a source may include a source computing system associated with or more of: an e-commerce platform, an online payment platform, a logistics service platform, a shipping service platform, an inventory management platform, a production management platform, a process management platform, an online marketplace platform, an affiliate network platform, an application programming interface provider platform, a cloud service provider platform, a virtual machine platform, a container orchestration platform, an infrastructure as a service platform, a function as a service platform, a data storage service platform, a database service provider platform, a cloud messaging provider platform, an event streaming service provider platform, or a platform as a service. As examples, a destination may include a destination computing system associated with one or more of the foregoing (e.g., an e-commerce platform . . . or a platform as a service). In one example, a source may include a source computing system associated with an upstream business unit, a supplier, a service provider, or a seller, and a destination may include a destination computing system associated with a downstream business unit, a customer, a service recipient, or a buyer. The upstream business unit, the supplier, the service provider, or the seller may be associated with one or more of the foregoing. Additionally, or in the alternative, the downstream business unit, the customer, the service recipient, or the buyer may be associated with one or more of the foregoing.

In one example, the source and the destination may be reversed, for example, when transferring data items in an upstream direction, such as from a downstream source to an upstream destination. In one example, a source for one transfer of data items may be a destination for another transfer of data items. Additionally, or in the alternative, a destination for one transfer of data items may be a source for another transfer of data items. In one example, a mapping expression may be utilized for downstream or upstream transformations. Additionally, or in the alternative, the mapping expressions repository 110 may include one or more inverse pairs of mapping expressions that include an upstream mapping expression for upstream transformations and a downstream mapping expression for downstream transformations. In one example, a transformation module may be utilized for downstream or upstream transformations. Additionally, or in the alternative, the transformation module repository 112 may include one or more inverse pairs of transformation modules that include an upstream transformation module for upstream transformations and a downstream transformation module for downstream transformations.

As used herein, the term "data-serialization element" refers to (a) a container used to represent structured data in connection with a serialization format or data interchange format, or (b) schema that define the structure or constraints for a container used to represent the structured data. The term "source data-serialization element" refers to a data-serialization element corresponding to a source. The term "destination data-serialization element" refers to a data-serialization element corresponding to a destination.

As used herein, the term "container" or "container element" refers to a data-serialization element that has the form of an object, an array, or another structure configured to hold or organize data in connection with a serialization format or data interchange format. An object may include one or more key-value pairs. The key may represent a string, and the value may represent any valid data structure. The key may sometimes be referred to as a value field. An array may include an ordered list of values. The values in an array may include any valid data structure. The valid data structures in a key-value pair of an object may include another object (e.g., a nested object), an array, a number, a string, a Boolean, or a null value. The valid data structures in an array may include another array (e.g., a nested array), an object, a number, a string, a Boolean, or a null value. A number may represent a numeric value, such as an integer or a floating-point number. A strong may represent a sequence of Unicode characters. A Boolean may represent one of two possible values, such as either true or false. A null value may represent an empty value or an absence of data. Containers, objects, arrays, or other structures associated with a source may be respectively referred to as a source container, a source object, a source array, or a source structure. Containers, objects, arrays, or other structures associated with a destination may be respectively referred to as a destination container, a destination object, a destination array, or a destination structure.

As used herein, the term "schema" or "schema element" refers to a data-serialization element that defines one or more structures or constraints to be expected for one or more containers, such as a structure or a constraint for one or more properties, items, or elements, of a container. Schemas may define the properties, data types, validations, or other rules for the data of a container. A schema may include objects, arrays, or other structures that are valid for containers in accordance with the serialization format or data interchange format. In one example, in the context of an object, a schema may specify one or more of: an expected data type, an expected format for a value, an expected property within an object, a required property within an object, whether additional properties are allowed in an object beyond those explicitly defined, a minimum value allowed for a number, a maximum value allowed for a number, a regular expression pattern that a string value must match, an enumeration of possible values that a property can have, one or more dependencies between properties. Additionally, or in the alternative, in the context of an array, a schema may specify one or more of: schema for the elements within the array, whether additional items are allowed in the array, a minimum number of items allowed in the array, a maximum number of items allowed in the array, whether all elements in the array must be unique, a schema that at least one element in the array must match. Additionally, or in the alternative, a schema may specify one or more logical operators for considering multiple schema, such as: whether all of the schema elements are required, whether any of the schema elements are allowed, or whether at least one of the schema elements is required, or whether a particular schema element is not allowed. A schema may be distinguished from an object, array, or other structure based on one or more of: structure, syntax, context, purpose, or presence or absence of schema-related keywords (e.g., "type," "required," "items," etc.). In one example, a serialization format document or data interchange format document may include a set of containers accompanied by one or more schema elements. Additionally, or in the alternative, a serialization format document or data interchange format document may explicitly represent schema, for example, that may be referenced by another serialization format document or data interchange format document.

As used herein, the term "payload" refers to a set of one or more data-serialization objects that respectively include data values conforming to the structure defined by the respective data-serialization objects. The data values in a payload may include actual data being transmitted or used. Additionally, or in the alternatives, a payload may include placeholder values or null values that may be replaced with actual data values, for example, when the actual data values become available. A payload corresponding to a source may be referred to as a source payload. A payload corresponding to a destination may be referred to as a destination payload.

In some embodiments, the terms "serialization format" and "data interchange format" may be used interchangeably and generally both refer to formats that facilitate the representation, transmission, and/or storage of structured data, for example, between different systems, applications, or programming languages. The term "serialization format" may be used to emphasize the process of converting data into a specific format that can be serialized (e.g., converted to a linear stream of bytes or characters) for various purposes, such as transmission or storage. The term "data interchange format" may be used to emphasize the ability to interchange or exchange data between different systems, applications, or platforms. Example serialization formats or data interchange formats include: JSON (JavaScript Object Notation), XML (eXtensible Markup Language), YAML ("Yet Another Markup Language," or "YAML Ain't Markup Language), Protocol Buffers, aVro, MessagePack, BSON (Binary JSON), Thrift, Parquet, Apache Arrow, or HDF5 (Hierarchical Data Format).

B. System Components.

The data-serialization element mapping system 104 may include one or more components configured to carry out the various operations of the system 100. As shown in FIG. 1A, the data-serialization element mapping system 104 may include one or more of: a mapping engine 114, an element generation engine 116, a rules engine 118, a graphics engine 120, or a transformation engine 122.

The mapping engine 114 may be configured to execute operations associated with generating and storing in the mapping expressions repository 110, mapping expressions that define a mapping association between one or more source data-serialization elements and one or more destination data-serialization elements. The operations of the mapping engine 114 may be generated automatically, or in response to an input from a user device interface. The mapping expressions may include one-to-one mapping expressions configured to map one source data-serialization element to one destination data-serialization element, one-to-many mapping expressions configured to map one source data-serialization element to multiple destination data-serialization elements, and/or many-to-one mapping expressions configured to map multiple source data-serialization elements to one destination data-serialization element. Additionally, or in the alternative, the mapping expressions may include concatenation operations configured to combine multiple source data-serialization elements into a destination data-serialization element. Additionally, or in the alternative, the mapping expressions may include partition operations configured to divide portions of a source data-serialization element into multiple destination data-serialization elements.

In one example, the mapping expressions may include transformation operations. The transformation operations may include operations configured to change a data structure or a schema corresponding to a container. A transformation operation may be performed, for example, to allow transferring of a source payload (or data values corresponding to the respective source data-serialization elements) to a destination payload (or data values corresponding to the respective destination data-serialization elements). Additionally, or in the alternative, a transformation operation may be performed to allow a destination payload (or respective destination data-serialization elements) to receive data values from a source payload (or respective source data-serialization elements). Additionally, or in the alternative, a transformation operation may be performed to conform a source payload, respective source data-serialization elements, or values corresponding to the respective source data-serialization elements, to a data structure or a schema required by a destination. For example, a transformation operation may include modifying a schema as between a source data-serialization element and a destination data-serialization element.

The element generation engine 116 may be configured to execute operations associated with generating data-serialization elements and/or payloads, including source data-serialization elements, source payloads, destination data-serialization elements, and/or destination payloads. The operations of the element generation engine 116 may be triggered automatically, or in response to an input from a user device interface. The data-serialization elements generated by the element generation engine 116 may include copies of pre-existing data-serialization elements or newly generated data-serialization elements. For example, the element generation engine 116 may generate a copy of a source data-serialization elements as a destination data-serialization elements, such as when a destination or a destination payload lacks a destination data-serialization element corresponding to a source data-serialization element. Additionally, or in the alternative, the element generation engine 116 may generate new source data-serialization elements and/or new destination data-serialization elements, for example, when both the source and the destination lack data-serialization elements and/or payloads for a particular operation. In one example, the element generation engine 116 may generate a destination payload and/or a set of destination data-serialization elements representing a destination payload, for example, when the destination lacks a destination payload or a corresponding set of destination data-serialization elements for a particular operation.

The rules engine 118 may be configured to execute operations associated with applying one or more mapping rules to mapping associations, and determining whether mapping associations satisfy the mapping rules. In one example, one or more operations performed by the mapping engine 114, such as generating mapping expressions, may be contingent upon a mapping association for the mapping expression satisfying one or more mapping rules.

In one example, a mapping rule may prohibit mapping of a source data-serialization element with a destination data-serialization element when the destination data-serialization element is incongruent with the source data-serialization element. A destination data-serialization element may be incongruent with a source data-serialization element based on a difference in a container or a difference in schema as between the source and the destination. For example, an incongruency may be based on a container having an invalid data structure and/or based on a data value violating one or more schema for the container. Additionally, or in the alternative, a mapping rule may prohibit mapping of a source payload with a destination payload when the destination payload is incongruent with the source payload. A destination payload may be incongruent with a source payload based on one or more data-serialization elements and/or one or more data values in the payload.

In one example, a mapping rule may prohibit mapping of a source container with a destination container when the source container is incongruent with the destination container. A source container may be incongruent with a destination container based on a difference between the source container and the destination container, such as a difference in data structures. For example, a source container configured as an array may be incongruent with a destination container configured as an object. Additionally, or in the alternative, a mapping rule may prohibit mapping of a source schema with a destination schema when the source schema is incongruent with the destination schema. A source schema may be incongruent with a destination schema based on a difference between the source schema and the destination schema, such as a difference with respect to one or more properties, data types, validations, or other rules. Additionally, or in the alternative, a mapping rule may prohibit mapping of a source container with a destination container when the source container has a source data structure defined by a source schema that is incongruent with a destination schema that defines a data structure of the destination container. Additionally, or in the alternative, a mapping rule may prohibit mapping a source container to a destination schema, or a source schema to a destination container.

The graphics engine 120 may be configured to execute operations associated with generating and displaying various graphical content in a GUI. In one example, the graphics engine 120 may concurrently generate and display a source region presenting source data-serialization elements, a destination region presenting destination data-serialization elements, and mapping region presenting mapping elements representing mapping associations between source data-serialization elements and destination data-serialization elements. Additionally, or in the alternative, the graphics engine 120 may be configured to generate and display the mapping elements representing the mapping associations. Additionally, or in the alternative, the graphics engine 120 may be configured to generate and display mapping lines that graphically depict mapping associations. The mapping lines may include source mapping lines that respectively extend between a source data-serialization element and a mapping element, and destination mapping lines that respectively extend between a mapping element and a destination data-serialization element. Additionally, or in the alternative, the mapping lines may respectively extend between a source data-serialization element and a destination data-serialization element. The graphics engine 120 may further generate and display various interactive elements that may receive various selections or inputs via a user device interface.

The transformation engine 122 may be configured to execute operations associated with generating and storing transformation modules in the transformation module repository 112. The transformation engine 122 may generate the executable code that encodes mapping expressions configured to transform a source payload to a destination payload based on one or more mapping expressions, and/or to transfer source data values corresponding to a source payload to respective locations in a destination payload based on the one or more mapping expressions.

C. System Interfaces.

Referring further to FIG. 1A, the system 100 may include a user device interface 124 communicatively coupled or couplable with the data-serialization element mapping system 104 and/or the data repository 102. The user device interface 124 may include hardware and/or software configured to facilitate interactions between a user and various aspects of the system 100, such as the data-serialization element mapping system 104 and/or the data repository 102. The user device interface 124 may render user interface elements and receive input via user interface elements.

Examples of interfaces include a GUI, a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of a user device interface 124 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user device interface 124 may be specified in one or more other languages, such as Java, C, or C++.

Figure 1B:
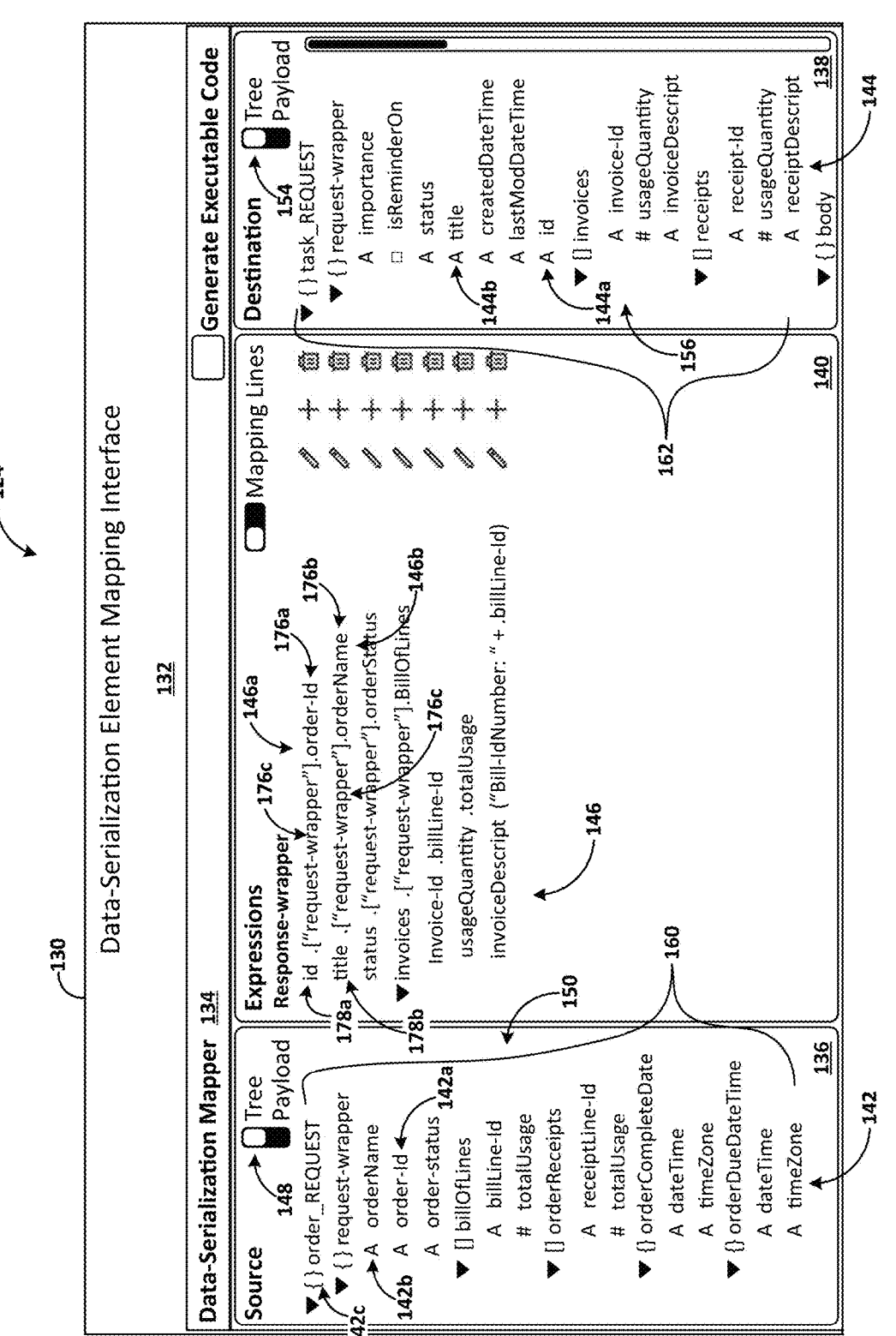
FIGS. 1B-1D illustrate an example user device interface of the system of FIG. 1A, including a data-serialization mapping interface, in accordance with one or more embodiments.
Figure 1C:
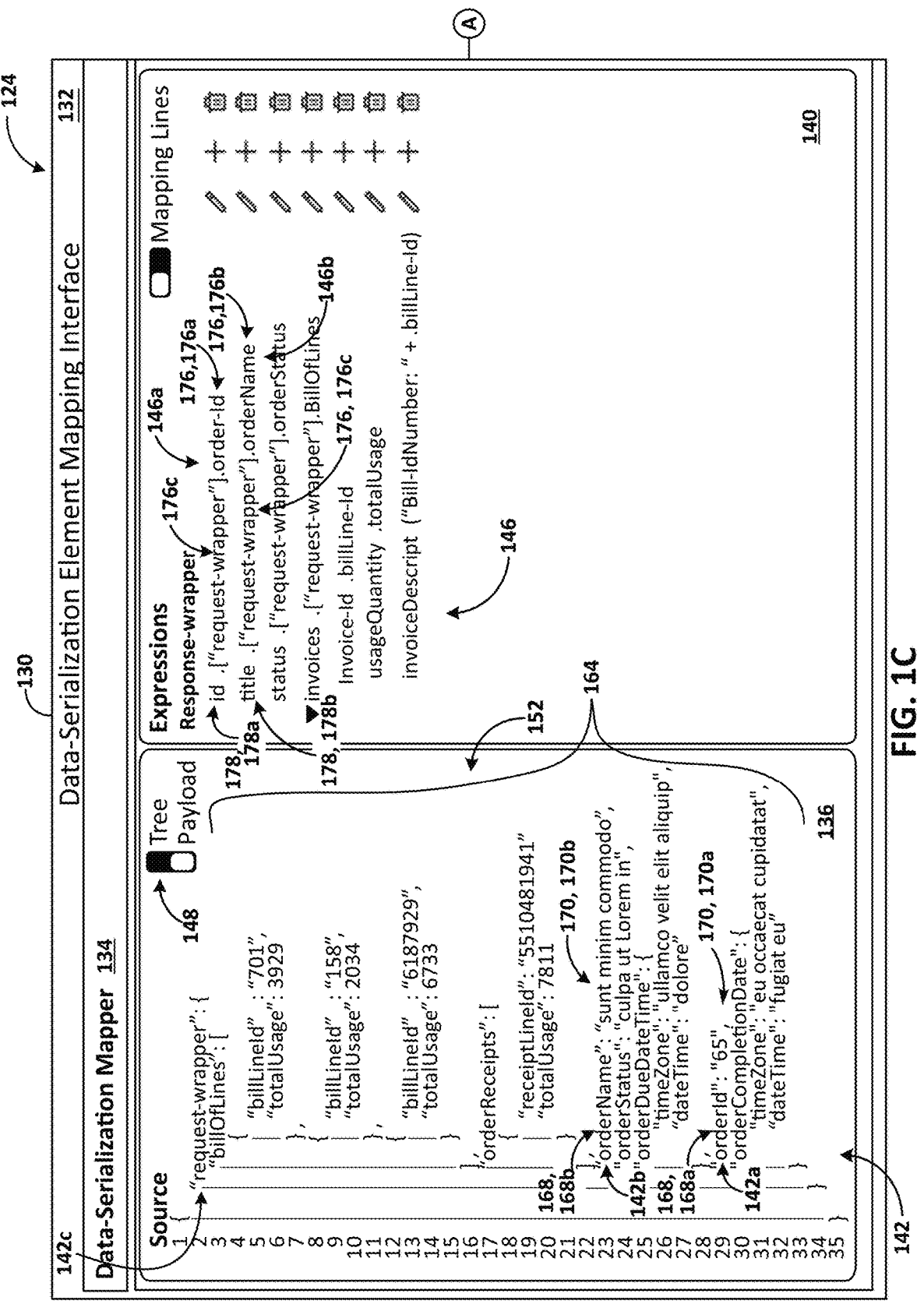
Figure 1C:
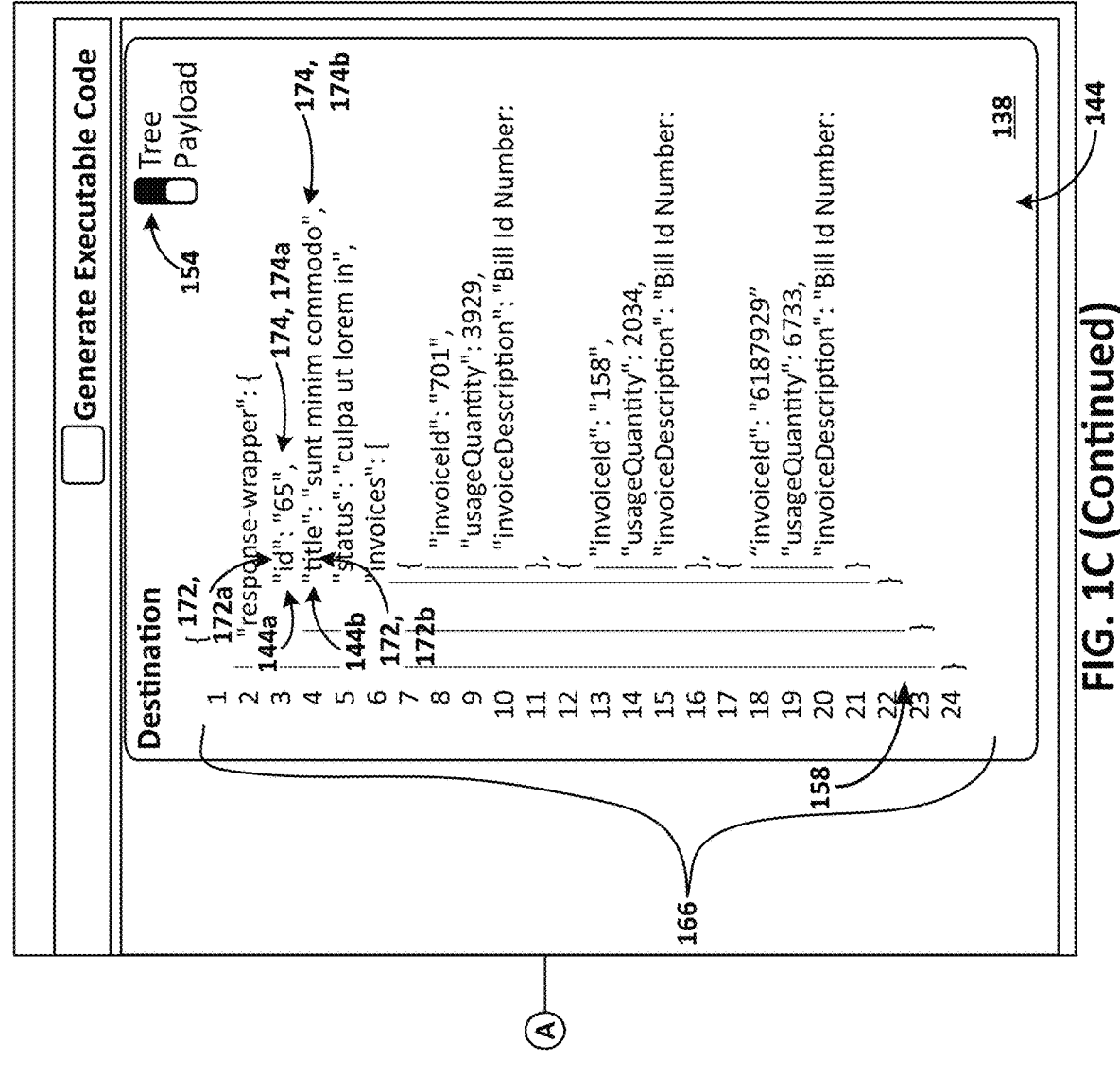
Figure 1D:
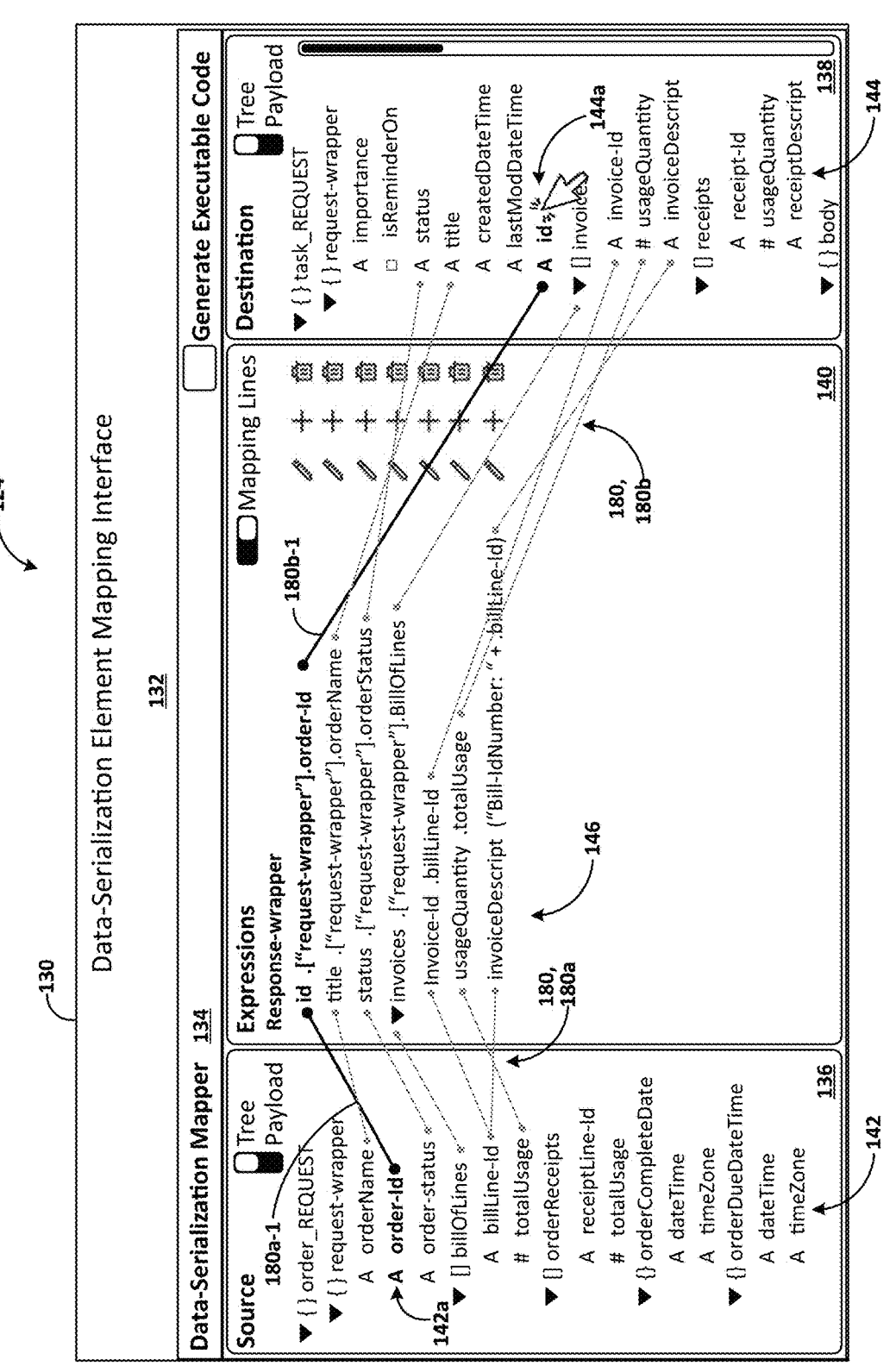

Referring to FIGS. 1B-1D, example user device interfaces 124 are further described. As shown in FIGS. 1B-1D, a user device interface may include a GUI 130 that includes a data-serialization element mapping interface 132. The data-serialization element mapping interface 132 may include a data-serialization mapper 134. The data-serialization mapper 134 may include a source region 136, a destination region 138, and a mapping region 140. The GUI 130 may concurrently display the source region 136, the destination region 138, and the mapping region 140. The source region 136 may present a set of source data-serialization elements 142. The destination region 138 may present a set of destination data-serialization elements 144. The mapping region 140 may present a set of mapping elements 146 representing mapping associations between source data-serialization elements and destination data-serialization elements.

Referring to FIGS. 1B and 1C, the source region 136 may include a source payload toggle 148 configured to toggle the source region 136 between a source tree display 150 (FIG. 1B) and a source payload display 152 (FIG. 1C). Additionally, or in the alternative, the destination region 138 may include a destination payload toggle 154 configured to toggle the destination region 138 between a destination tree display 156 (FIG. 1B) and a destination payload display 158 (FIG. 1C). As shown in FIG. 1B, the source tree display 150 may present source data-serialization elements 142 in the form of a source tree structure 160. As further shown in FIG. 1B, the destination tree display 156 may present destination data-serialization elements 144 in the form of a destination tree structure 162. The source tree structure 160 and/or the destination tree structure 162 may visually represent a hierarchy of data-serialization elements. The source tree structure 160 may show a source hierarchy among at least some of the source data-serialization elements 142. The source hierarchy may include source data-serialization elements 142 that have a nested relationship relative to one another, such as a parent-child relationship or a child-parent relationship, and/or data-serialization elements that have a sibling relationship to one another. The destination tree structure 162 may show a destination hierarchy among at least some of the destination data-serialization elements 144. The source hierarchy may include data-serialization elements 144 that have a nested relationship relative to one another, such as a parent-child relationship or a child-parent relationship, and/or data-serialization elements that have a sibling relationship to one another.

As shown in FIG. 1C, the source payload display 152 may present source data-serialization elements 142 in the form of a source payload structure 164. As further shown in FIG. 1C, the destination payload display 158 may present destination data-serialization elements 144 in the form of a destination payload structure 166. The source payload structure 164 and/or the destination payload structure 166 may visually represent a payload that includes a hierarchy of data-serialization elements. The source tree structure 160 may show data-serialization elements that have a nested relationship relative to one another, such as a parent-child relationship or a child-parent relationship, and/or data-serialization elements that have a sibling relationship to one another.

In one example, as shown in FIG. 1C, the source data-serialization elements 142 shown in the source payload structure 164 may include a source value field 168 and a source value 170. Additionally, or in the alternative, the destination data-serialization elements 144 shown in the destination payload structure 166 may include a destination value field 172 and a destination value 174. As a result of the mapping, the destination value field 172 may be mapped to the source value field 168, and the destination value field 172 may be populated with a copy of the source value 170. The copy of the source value 170 may occupy the destination value field 172, such that the destination value 174 matches the source value 170. For example, as shown in FIG. 1C, mapping element 146a may include destination data-serialization element 144a mapped to source data-serialization element 142a. As a result of the mapping element 146a, destination value field 172a is mapped to source value field 168a, and destination value 174a matches source value 170a. As further shown in FIG. 1C, mapping element 146b may include destination data-serialization element 144b mapped to source data-serialization element 142b. As a result of the mapping element 146b, destination value field 172b is mapped to source value field 168b, and destination value 174b matches source value 170b.

Referring further to FIGS. 1B and 1C, the mapping elements 146 representing mapping associations may include a source mapping element 176 and a destination mapping element 178. A source mapping element 176 may identify at least one source data-serialization element 142 included in the mapping association represented by the mapping element 146. A destination mapping element 178 may identify at least one destination data-serialization element 144 included in the mapping association represented by the mapping element 146. For example, FIGS. 1B and 1C show source mapping element 176a that corresponds to source data-serialization element 142a, and destination mapping element 178a that corresponds to destination data-serialization element 144a. FIGS. 1B and 1C further show source mapping element 176b that corresponds to source data-serialization element 142b, and destination mapping element 178b that corresponds to destination data-serialization element 144b.

In one example, a mapping expression may include an association between a parent data-serialization element and a child data-serialization element. For example, as shown in FIGS. 1B and 1C, source data-serialization element 142a may represent child data-serialization elements with respect to source data-serialization element 142c, and source data-serialization element 142c may represent a parent data-serialization element with respect to source data-serialization element 142a. Additionally, or in the alternative, as shown with respect to mapping element 146a, source mapping element 176a may represent a child mapping element, and source mapping element 176c may represent a parent mapping element. Similarly, source data-serialization element 142b may represent child data-serialization elements with respect to source data-serialization element 142c, and source data-serialization element 142*c* may represent a parent data-serialization element with respect to source data-serialization element 142*b*. Additionally, or in the alternative, as shown with respect to mapping element 146*a*, source mapping element 176*a* may represent a child mapping element, and source mapping element 176*c* may represent a parent mapping element.

Referring now to FIG. 1D, a GUI 130, such as a data-serialization element mapping interface 132, may present mapping lines 180 that graphically depict mapping associations corresponding to respective mapping elements 146. The mapping lines may include source mapping lines 180*a* that respectively extend between a source data-serialization element 142 and a mapping element 146, and destination mapping lines 180*b* that respectively extend between a mapping element 146 and a destination data-serialization element 144. Additionally, or in the alternative, the mapping lines 180 may respectively extend between a source data-serialization element and a destination data-serialization element. In one example, the mapping lines 180 may be highlighted or bolded when at corresponding source data-serialization element, destination data-serialization element, or mapping element 146 is selected. For example, FIG. 1D shows source mapping line 180*a*-1 and destination mapping line 180*b*-1 bolded from destination data-serialization element 144*a* having been selected.

Referring again to FIG. 1A, the system 100 may include a communications interface 126 communicatively coupled or couplable with the data-serialization element mapping system 104 and/or the data repository 102. The communications interface 126 may include hardware and/or software configured to transmit data to and/or from the system 100, and or between respective components of the system 100. For example, the communications interface 126 may transmit and/or receive data between and/or among the data-serialization element mapping system 104, the data repository 102, and/or the user device interface 124.

In one example, the data-serialization element mapping system 104 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

D. Integration Server.

Figure 1E:
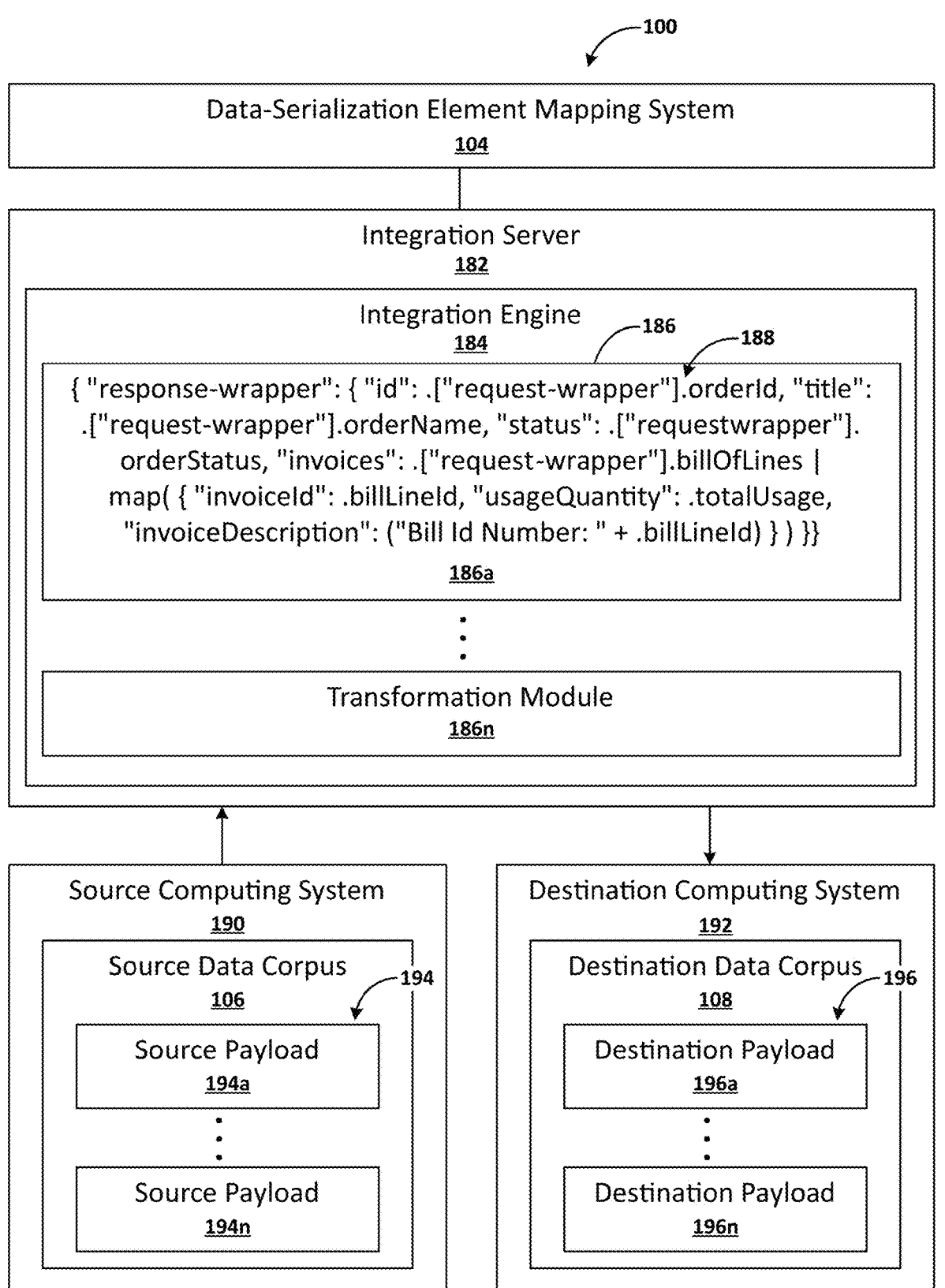
FIG. 1E illustrates further aspects of the example system of FIG. 1A, including an integration server for transforming source payloads associated with a source computing system to destination payloads associated with a destination computing system.

Referring now to FIG. 1E, the system 100 may include an integration server 182. The data-serialization element mapping system 104 may be communicatively coupled or couplable with the integration server 182, or the data-serialization element mapping system 104 may define a portion of the integration server 182. The integration server 182 may be configured to perform operations associated with transforming source payloads associated with a source computing system to destination payloads associated with a destination computing system. Additionally, or in the alternative, the operations may include transferring source data values corresponding to source payloads to respective locations in destination payloads.

As shown in FIG. 1E, the integration server may include an integration engine 184. The integration engine 184 may perform the transformation operations utilizing one or more transformation modules 186 that include executable code 188 that encodes a set of mapping expressions configured to transform a source payload to a destination payload based on one or more mapping expressions that define mapping associations between source data-serialization elements corresponding to the source payload and destination data-serialization elements corresponding to the destination payload. The integration engine 184 may utilize different transformation modules 186 depending on the source and/or the destination. Additionally, or in the alternative, the integration engine 184 may utilize different transformation modules 186 depending on the configuration of the source payload and/or the destination payload. For example, transformation module 186*a* may include executable code 188 corresponding to a particular source and/or a particular source payload, and a particular destination and/or a particular destination payload. Transformation module 186*n* may be configured for another source and/or source payload, or for another destination and/or destination payload.

The integration server 182 may be communicatively coupled or couplable with one or more source computing systems and one or more destination computing systems, such as source computing system 190 and destination computing system 192. The source computing system 190 may include a source data corpus 106 that includes a set of source payloads 194. The destination computing system 192 may include a destination data corpus 108 that includes a set of destination payloads 196. In one example, destination payload 194*a* may be transformed to destination payload 196*a*, for example, using executable code 188 in transformation module 186*a*. In one example, destination payload 194*n* may be transformed to destination payload 196*n*, for example, using transformation module 186*n*. The transformation may include generating a new destination payload 196. Additionally, or in the alternative, the transformation may include adding source values to empty value fields in the destination payload.

3. Example Mapping Operations

Figure 2A:
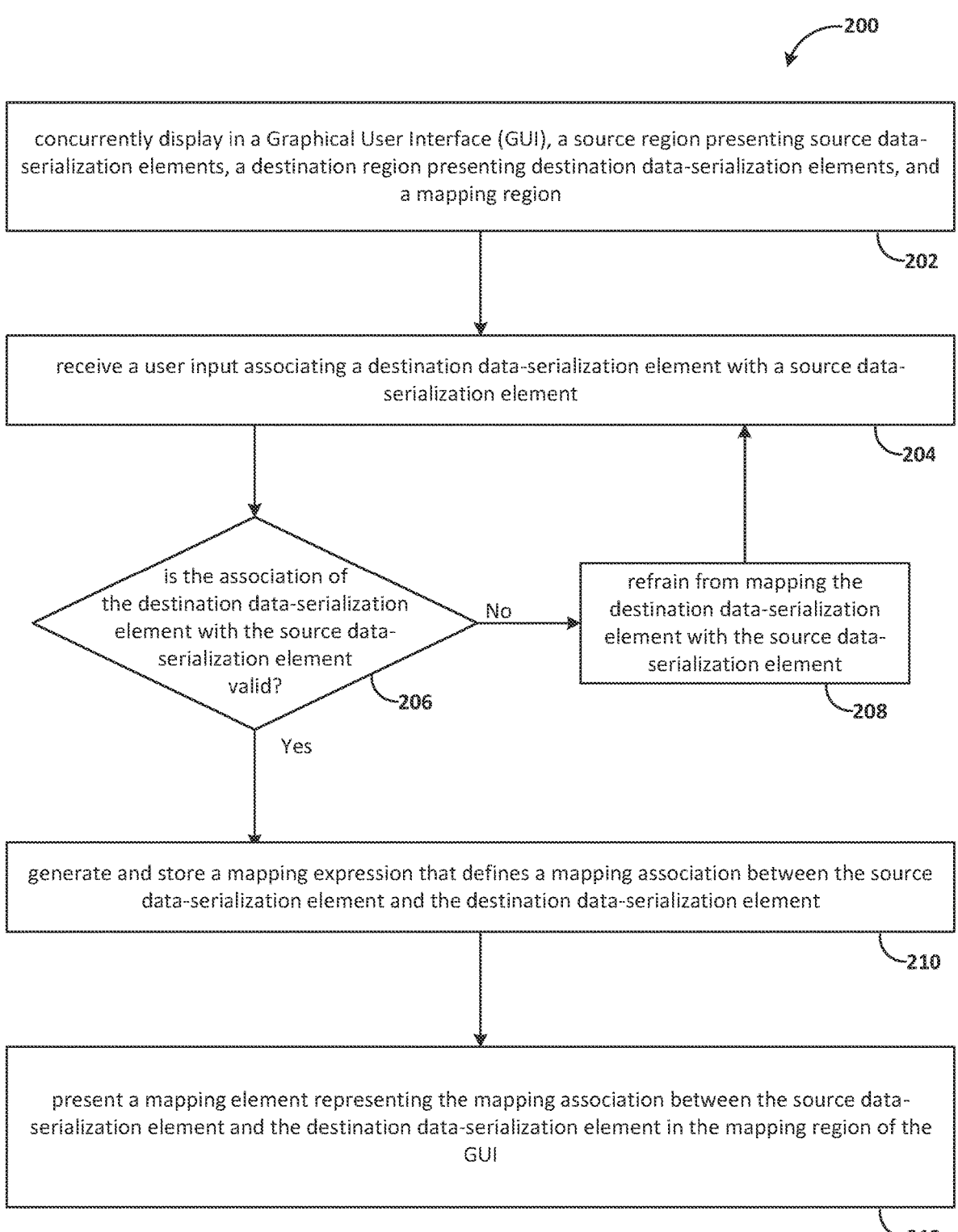
FIG. 2A illustrates example operations that may be performed by the system, including operations associated with generating mapping expressions that define mapping associations between data-serialization elements and presenting mapping elements representing the mapping expressions in a user device interface, in accordance with one or more embodiments.

Referring now to FIGS. 2A-2C, example operations 200 associated with the system 100 are further described. The operations 200 described with reference to FIGS. 2A-2C may be associated with one or more components of the data-serialization element mapping system 104. One or more operations shown in FIGS. 2A, 2C, and/or 2C may be modified, rearranged, or omitted all together. Accordingly, the particular sequence of operations shown in FIGS. 2A, 2B, and 2C should not be construed as limiting the scope of one or more embodiments.

A. Generating Mapping Expressions.

As shown in FIG. 2A, example operations 200 may include operations associated with generating mapping expressions that define mapping associations between data-serialization elements and presenting mapping elements representing the mapping expressions in a user device interface. In one example, the operations 200 may include at block 202, concurrently displaying in a GUI, a source region presenting source data-serialization elements, and a destination region presenting destination data-serialization elements. At block 204, the operations 200 may include receiving a user input associating a destination data-serialization element with a source data-serialization element. The user input may include dragging and dropping a source data-serialization element from the source region of the GUI to the mapping region of the GUI. Additionally, or in the alternative, the user input may include dragging and dropping a destination data-serialization element from the destination region of the GUI to the mapping region of the GUI. The user input may associate the source data-serialization element and the destination data-serialization element with one another in the mapping region of the GUI.

At block 206, the operations 200 may include determining whether the association of the destination data-serialization element with the source data-serialization element is valid. For an association that is not valid, the operations 200 may proceed to block 208. For an association that is valid, the operations 200 may proceed to block 210. The validity of the association between the destination data-serialization element and the source data-serialization element may be determined based on one or more mapping rules. At block 208, for an association that is not valid, the operations 200 may include refraining from mapping the destination data-serialization element with the source data-serialization element. From block 208, the operations 200 may return to block 204, where another user input associating a destination data-serialization element with a source data-serialization element may be received.

At block 210, for an association that is valid, the operations 200 may include generating and storing a mapping expression that defines a mapping association between the source data-serialization element and the destination data-serialization element. At block 212, the operations 200 may include presenting a mapping element representing the mapping association between the source data-serialization element and the destination data-serialization element. The mapping element may be presented in a mapping region of the GUI. The mapping region of the GUI, including the mapping element, may be concurrently displayed with the source region and the destination region of the GUI.

B. Generating Data-Serialization Elements.

As shown in FIG. 2B example operations 200 may include operations associated with generating data-serialization elements for inclusion in mapping expressions. In one example, the operations 200 may include, at block 220, concurrently display in a GUI, a first region presenting first data-serialization elements, a second region presenting second data-serialization elements, and a mapping region presenting mapping elements corresponding to mapping associations between first data-serialization elements and second data-serialization elements. The first region may include a source region, and the second region may include a destination region. Alternatively, the first region may include the destination region and the second region may include the source region.

At block 222, the operations 200 may include receiving a first user input generating or identifying a first data-serialization element associated with a first serialized data corpus for inclusion in a mapping association. In one example, the first data-serialization element may be a selected from the first serialized data corpus. Alternatively, the first data-serialization element may be generated and added to the first serialized data corpus. The first serialized data corpus may be a source serialized data corpus. Alternatively, the first serialized data corpus may be a destination serialized data corpus.

At block 224, the operations 200 may include presenting in the mapping region of the GUI, a mapping element representing the mapping association including the first data-serialization element. Additionally, or in the alternative, the operations 200 may include, at block 224, presenting in the mapping region of the GUI, a mapping selection element for identifying at a second data-serialization element associated with a second serialized data corpus for inclusion in the mapping association.

At block 226, the operations 200 may include receiving a second user input generating or identifying a second data-serialization element being associated with the second serialized data corpus and being included in the mapping association. In one example, the second data-serialization element may be a selected from the second serialized data corpus. Alternatively, the second data-serialization element may be generated and added to the second serialized data corpus. In one example, the second data-serialization element may be copied from the first data-serialization element. The second user input may include identifying the first data-serialization element being copied as the second data-serialization element. When the first serialized data corpus is source serialized data corpus, the second serialized data corpus is the destination serialized data corpus. Alternatively, when the first serialized data corpus is the destination serialized data corpus, the second serialized data corpus is the source serialized data corpus.

At block 228, the operations may include determining whether the association of the first data-serialization element with the second data-serialization element valid. For an association that is valid, the operations 200 may proceed to block 230. The validity of the association between the destination data-serialization element and the source data-serialization element may be determined based on one or more mapping rules. At block 230, for an association that is not valid, the operations 200 may include refraining from mapping the destination data-serialization element with the source data-serialization element. From block 230, the operations 200 may return to block 222, where a first user input generating or identifying a first data-serialization element may be received. Alternatively, from block 230, the operations may return to block 226, where a second user input generating or identifying a second data-serialization element may be received.

At block 232, for an association that is valid, the operations 200 may include presenting in the second region of the GUI, the second data-serialization, and presenting in the mapping region of the GUI, the mapping association between the first data-serialization element and the second data-serialization element. At block 234, the operations may include generating and storing a mapping expression that defines a mapping association between the first data-serialization element and the second data-serialization element.

C. Updating Values.

As shown in FIG. 2C example operations 200 may include operations associated with updating values for data-serialization elements and displaying updated values computed from mapping expressions that define mapping associations between the data-serialization elements with updated values. In one example, the operations 200 may include, at block 240, concurrently display in a GUI, a source region presenting one or more source data-serialization elements, a destination region presenting one or more destination data-serialization elements, and a mapping region presenting mapping elements corresponding to mapping associations between one or more source data-serialization elements and one or more destination data-serialization elements.

At block 242, the operations 200 may include receiving a user input updating a source value of a source data-serialization element with an updated source value. The updated source value may be provided by a user typing or selecting the updated source value via the user device interface. At block 244, the operations 200 may include determining a mapping expression that defines a mapping association between the source data-serialization element and a destination data-serialization element. At block 246, the operations may include computing, based on the first mapping expression, an updated destination value of the destination data-serialization element. The updated destination value of the destination data-serialization element may reflect the source value having been updated with the updated source value.

At block 248, the operations 200 may include determining whether the updated source value and the updated destination value are valid.

For an updated source value or an updated destination value that is not valid, the operations 200 may proceed to block 250. When both the updated source value and the updated destination value are valid, the operations 200 may proceed to block 210. The validity of the updated source value and the updated destination value may be determined based on source schema for the updated source value, or destination schema for the updated destination value, respectively. Additionally, or in the alternative, the validity of the updated source value and the updated destination value may be determined based on one or more mapping rules. In one example, an updated source value may be invalid for violating source schema and/or one or more mapping rules. Additionally, or in the alternative, an update source value may be valid, but the corresponding updated destination value may be invalid for violating destination schema and/or one or more mapping rules.

At block 250, when either the update source value or the updated destination value is not valid, the operations 200 may include refraining from updating the source value with the updated source value. Additionally, or in the alternative, the operations 200 at block 250 may include refraining from updating the destination value with the updated destination value. From block 250, the operations 200 may return to block 242, where another user input updating a source value may be received.

At block 252, when both the updated source value and the updated destination value are valid, the operations 200 may include updating the source value with the updated source value, and updating the destination value with the updated destination value. At block 254, the operations 200 may include presenting in the source region of the GUI, the source value of the source data-serialization element being updated with the updated source value. At block 256, the operations 200 may include presenting in the destination region of the GUI, concurrently with the updated source value being presented in the source region of the GUI, the destination value of the destination data-serialization element being updated with the updated destination value.

4. Example Features of a Data-Serialization Element Mapping Interface

Referring now to FIGS. 3A-3I, example features of a data-serialization element mapping interface are further described. As shown, an example data-serialization element mapping interface 300 may include a source region 302, a destination region 304, and a mapping region 306. The example data-serialization element mapping interface 300 may include one or more of the features described with reference to FIGS. 1A-1E.

Figure 3A:
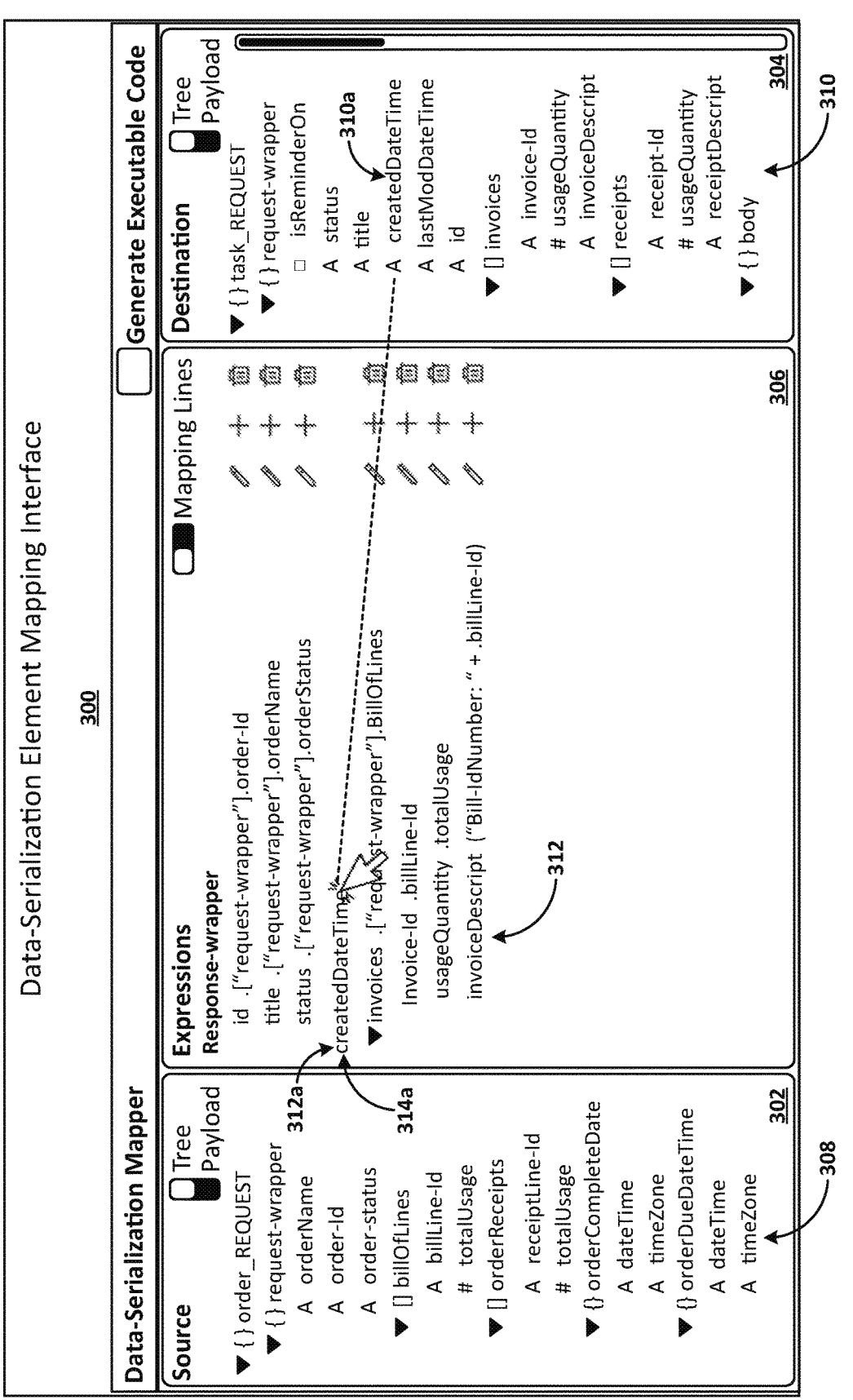
FIGS. 3A-3C illustrate example features of a data-serialization element mapping interface, including features associated with generating mapping expressions and presenting mapping elements, in accordance with one or more embodiments.
Figure 3B:
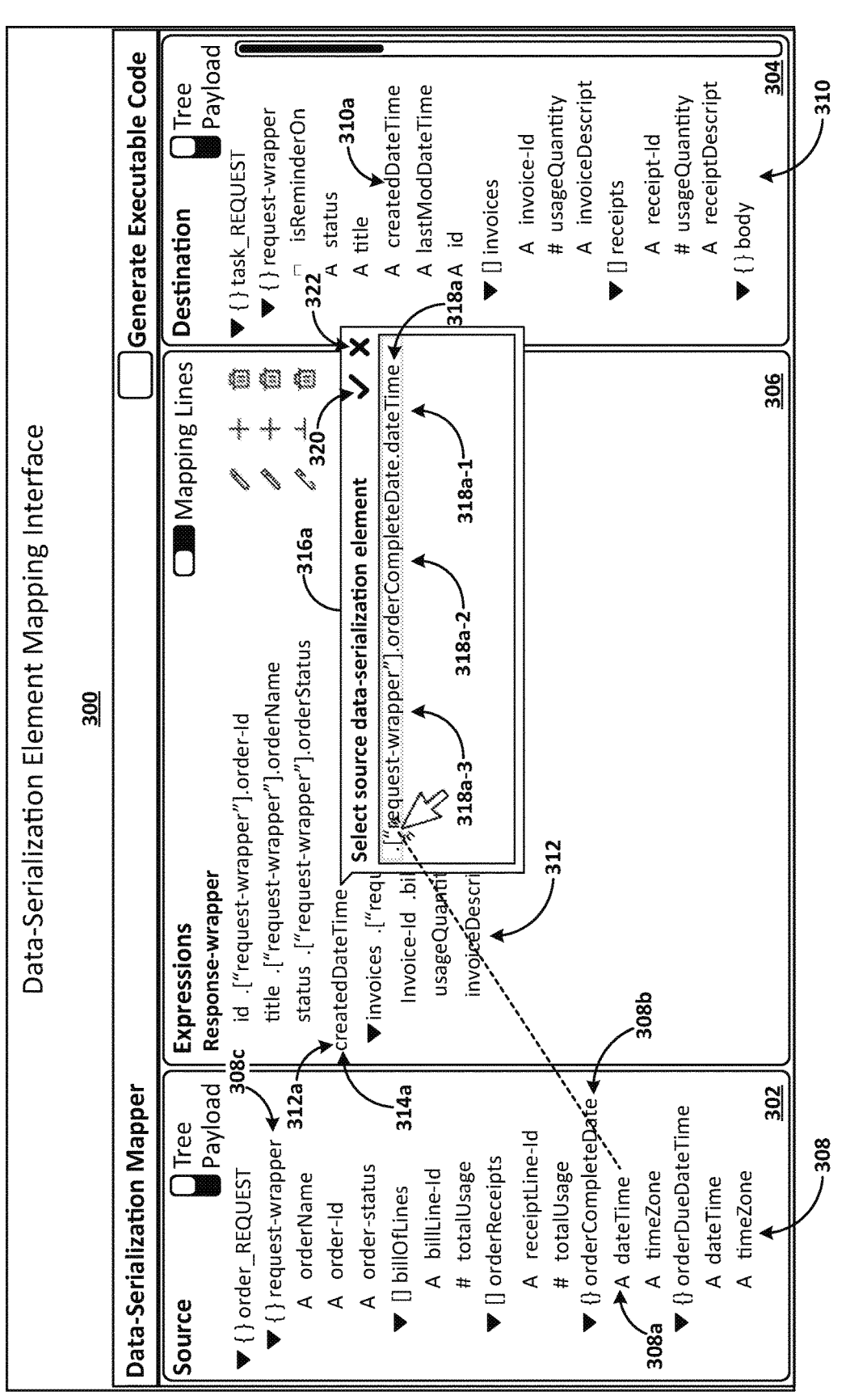
Figure 3C:
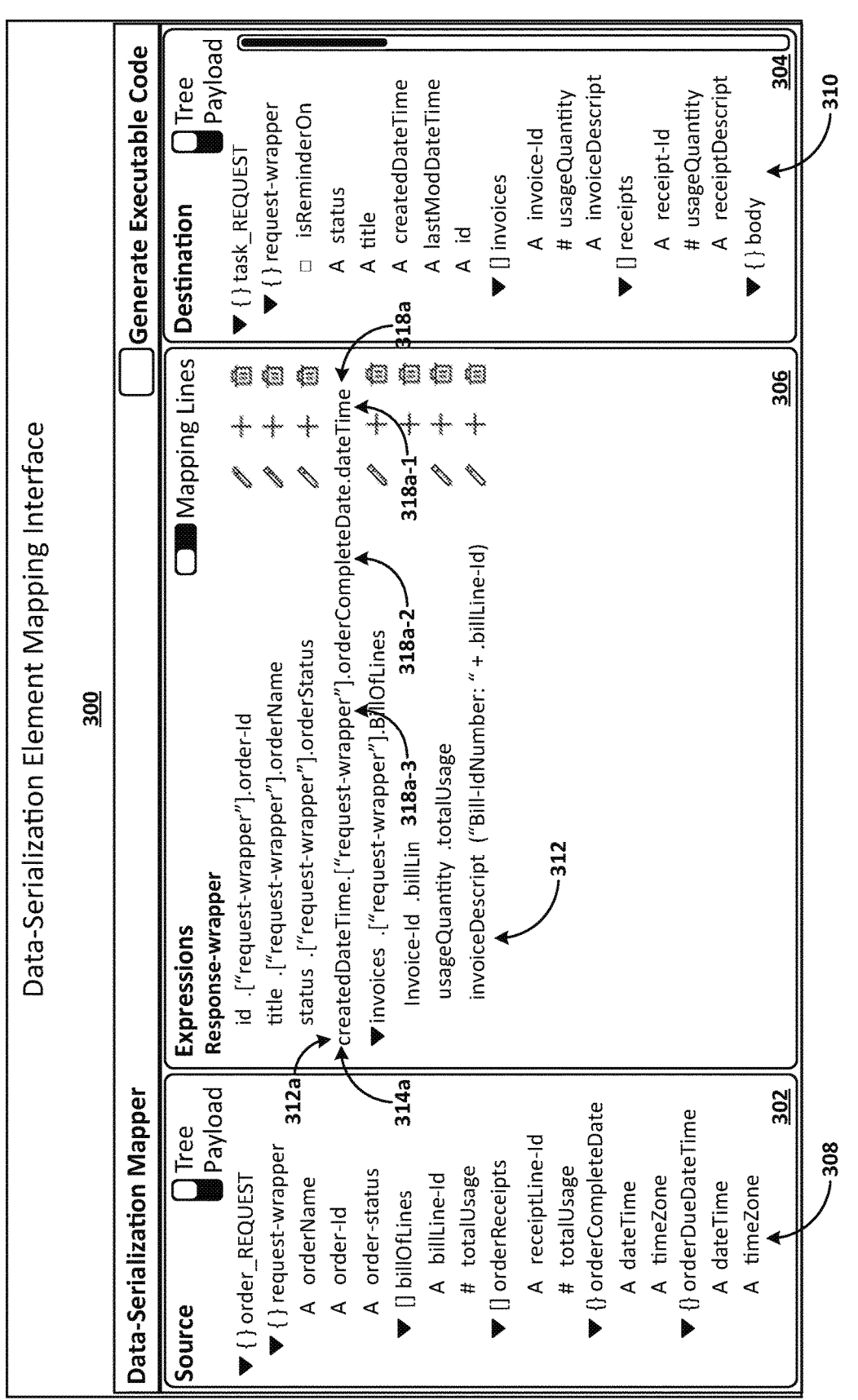

As shown in FIGS. 3A-3C, in one example, a data-serialization element mapping interface 300 may include features associated with generating mapping expressions between source data-serialization elements 308 and destination data-serialization elements 310. As further shown, a data-serialization element mapping interface 300 may include features associated with presenting mapping elements 312 corresponding to the mapping expressions.

As shown in FIG. 3A, a user may drag and drop a data-serialization element into the mapping region 306 of the data-serialization element mapping interface 300. For example, FIG. 3A shows a user dragging and dropping destination data-serialization element 310a into the mapping region 306. A drag-and-drop operation, for example, as shown in FIG. 3A, may trigger generation of at least a portion of a mapping element 312. Additionally, or in the alternative, the drag-and-drop operation may trigger initiation of generating the mapping expression corresponding to the mapping element. As shown, the mapping region 306 may present a portion of mapping element 312a region responsive to the drag-and-drop operation. In one example, the mapping region 306 may include a source mapping element representing the source data-serialization element included in the mapping expression, and a destination mapping element representing the destination data-serialization element included in the mapping expression. As shown, the dragging and dropping of the destination data-serialization element 310a may trigger generation of a destination mapping element 314a and presentation of the destination mapping element 314a in the mapping region 306.

As shown in FIG. 3B, the mapping region 306 may present a mapping selection element 316a, for example, responsive to the drag-and-drop operation. The mapping selection element 316a may be configured for identifying at least one additional data-serialization element for inclusion in the mapping expression corresponding to the mapping element 312a. For example, as shown, the mapping selection element 316a may receive a selection of a source data-serialization element 308 for inclusion in the mapping expression. The user may drag and drop source data-serialization element 308a from the source region 302 to the mapping selection element 316a to indicate the selection. Additionally, or in the alternative, the mapping selection element 316a may receive a selection of a destination data-serialization element 310 for inclusion in the mapping expression. In one example, the mapping expression may include an additional destination data-serialization element 310. In one example, a user may select the source data-serialization element 308 prior to selecting the destination data-serialization element 310.

As shown in FIG. 3B, the dragging and dropping of the source data-serialization element 308a may trigger generation of source mapping element 318a and presentation of the source mapping element 318a in the mapping selection element 316a. In one example, the dragging and dropping of a data-serialization element, such as source data-serialization element 308a, to the mapping selection element 316a may concurrently result in parent or child data-serialization elements being included in the mapping selection element 316a and/or in the corresponding mapping expression. The source mapping element 318a may include source mapping sub-elements representing child data-serialization elements and/or parent data-serialization elements. For example, as shown in FIG. 3B, source data-serialization element 308a is a child data-serialization element with respect to source data-serialization element 308b, and source data-serialization element 308b is a child data-serialization element with respect to source data-serialization element 308c. Likewise, source data-serialization element 308c is a parent data-serialization element with respect to source data-serialization element 308b, and source data-serialization element 308b is a parent data-serialization element with respect to source data-serialization element 308a. As further shown in FIG. 3B, in accordance with the parent and/or child relationships among the source data-serialization elements 308, the source mapping element 318a may include source mapping sub-element 318a-1 corresponding to source data-serialization element 308a, source mapping sub-element 318a-2 corresponding to source data-serialization element 308b, and source mapping sub-element 318a-3 corresponding to source data-serialization element 308c. The user may complete the generation of the mapping expression by selecting an accept button 320 configured to accept the selection of data-serialization elements represented in the mapping selection element 316a. Alternatively, the user may reject the selection of data-serialization elements represented in the mapping selection element 316a by selecting a reject button 322.

As shown in FIG. 3C, upon a user having selected the accept button 320 (FIG. 3B), the mapping region 306 may present mapping element 312a, including destination mapping element 314a and source mapping element 318a. Further, the system may generate and store the mapping expression corresponding to the mapping element 318a, for example, in a mapping expression repository.

Figure 3D:
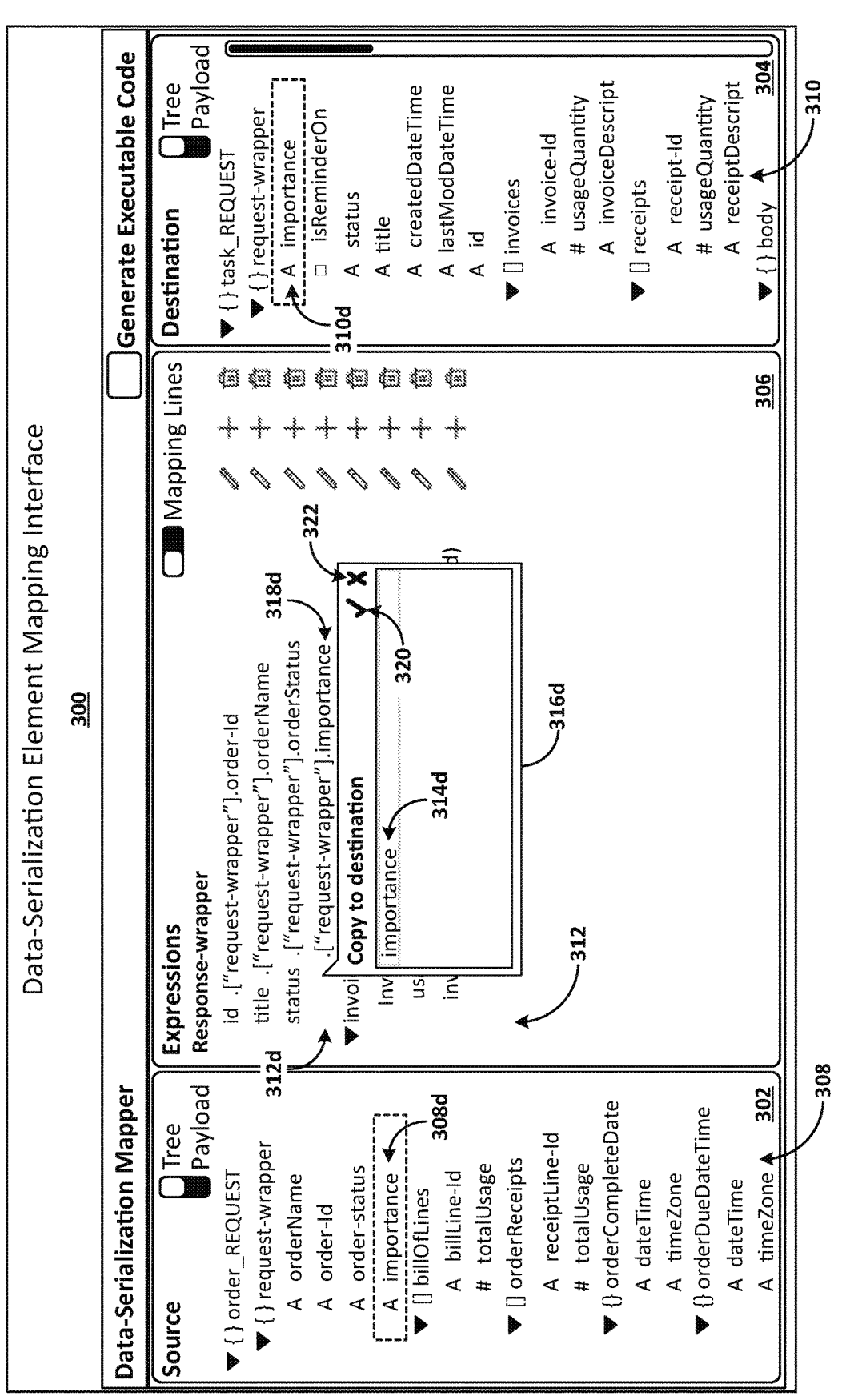
FIG. 3D illustrates example features of a data-serialization element mapping interface, including features associated with generating data-serialization elements for inclusion in mapping expressions, in accordance with one or more embodiments.

Referring now to FIG. 3D, example features of a data-serialization element mapping interface 300 may include features associated with generating data-serialization elements for inclusion in mapping expressions. In one example, as shown in FIG. 3D, a user may generate a new data-serialization element as a copy of an existing data-serialization element. For example, as shown, a user may generate destination data-serialization element 310d as a copy of source data-serialization element 308d. As further shown, the mapping region 306 may present mapping element 312d representing a mapping association between the destination data-serialization element 310d and the source data-serialization element 308d. Further, the system may generate a mapping expression that defines the mapping association between the destination data-serialization element 310d and the source data-serialization element 308d.

In one example, as shown in FIG. 3D, the data-serialization element mapping interface 300 may include a mapping selection element 316d. The user may select source data-serialization element 308d to be copied as destination data-serialization element 310d via mapping selection element 316d. Further, the user may input a name for destination data-serialization element 310d via mapping selection element 316d. As shown, upon selecting source data-serialization element 308d to be copied, the mapping region 306 may present source mapping element 318d. As further shown, mapping selection element 316d may present destination mapping element 314d. The system may infer the mapping association between the copied destination data-serialization element 310d and the source data-serialization element 308d, for example, based on the copying operation. Additionally, or in the alternative, the user may select one or more different or additional source data-serialization elements for association with destination data-serialization element 310d.

The user may select the accept button 320 to effect the generation of destination data-serialization element 310d as a copy of source data-serialization element 308d. Additionally, or in the alternative, upon the user selecting the accept button 320, the system may generate the mapping expression corresponding to mapping element 312d. Alternatively, the user may select the reject button 322 to reject generating the destination data-serialization element 310d and the corresponding mapping expression.

Referring now to FIGS. 3E-3H, features associated with generating data-serialization elements for inclusion in mapping expressions are further described. In one example, as shown in FIGS. 3E-3H, the data-serialization element mapping interface 300 may be configured for generating a new data-serialization element and a mapping association that includes the new data-serialization element. For example, as shown, a user may utilize the data-serialization element mapping interface 300 to generate a new destination data-serialization element 310e and to generate a mapping association between the new destination data-serialization element 310e and a source data-serialization element 308e. Responsive to generating the mapping association, the system may generate a mapping expression that associates the new destination data-serialization element 310e with the source data-serialization element 308e. The mapping region 306 may present a mapping element 312e representing the mapping expression for the association between the new destination data-serialization element 310e and the source data-serialization element 308e.

Figure 3E:
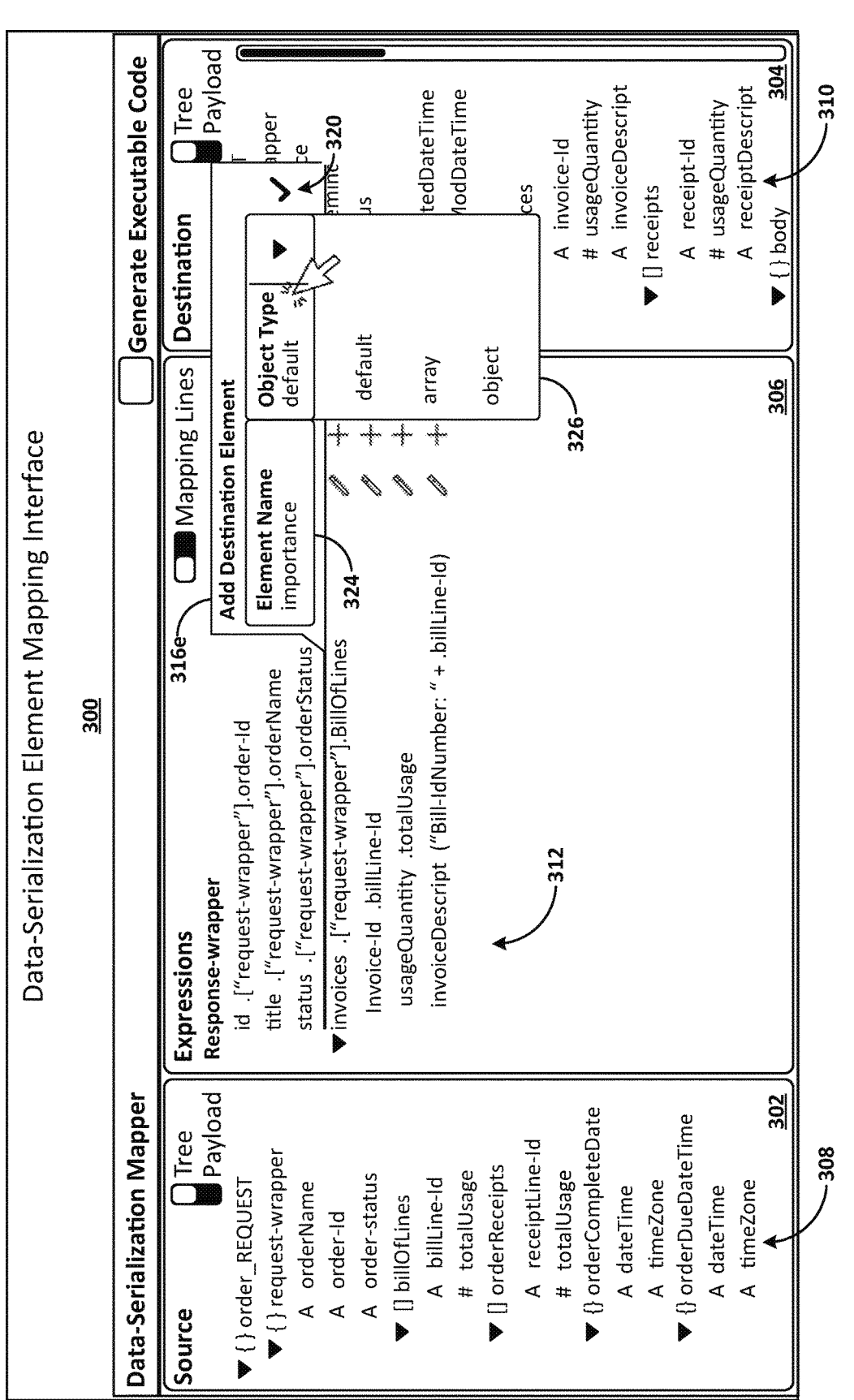
FIGS. 3E-3H illustrate further example features of a data-serialization element mapping interface, including further features associated with generating data-serialization elements for inclusion in mapping expressions, in accordance with one or more embodiments.

As shown in FIG. 3E, the data-serialization element mapping interface 300 may include a mapping selection element 316e. The user may utilize the mapping selection element 136e to generate a new data-serialization element, such as new destination data-serialization element. The mapping selection element 316e may include a name field 324 and an object selection field 326. The name field 324 may allow a user to input a name of the new data-serialization element. The object selection field 326 may allow a user to select a type of object for the new data-serialization element. In one example, the object selection field 326 may be configured to allow a user to select schema to be associated with the new data-serialization element. The system may automatically associate the schema with the new data-serialization element, for example, based on the user selection of the object type from the object selection field 326, or based on the user selection of schema to be associated with the new data-serialization element.

Figure 3F:
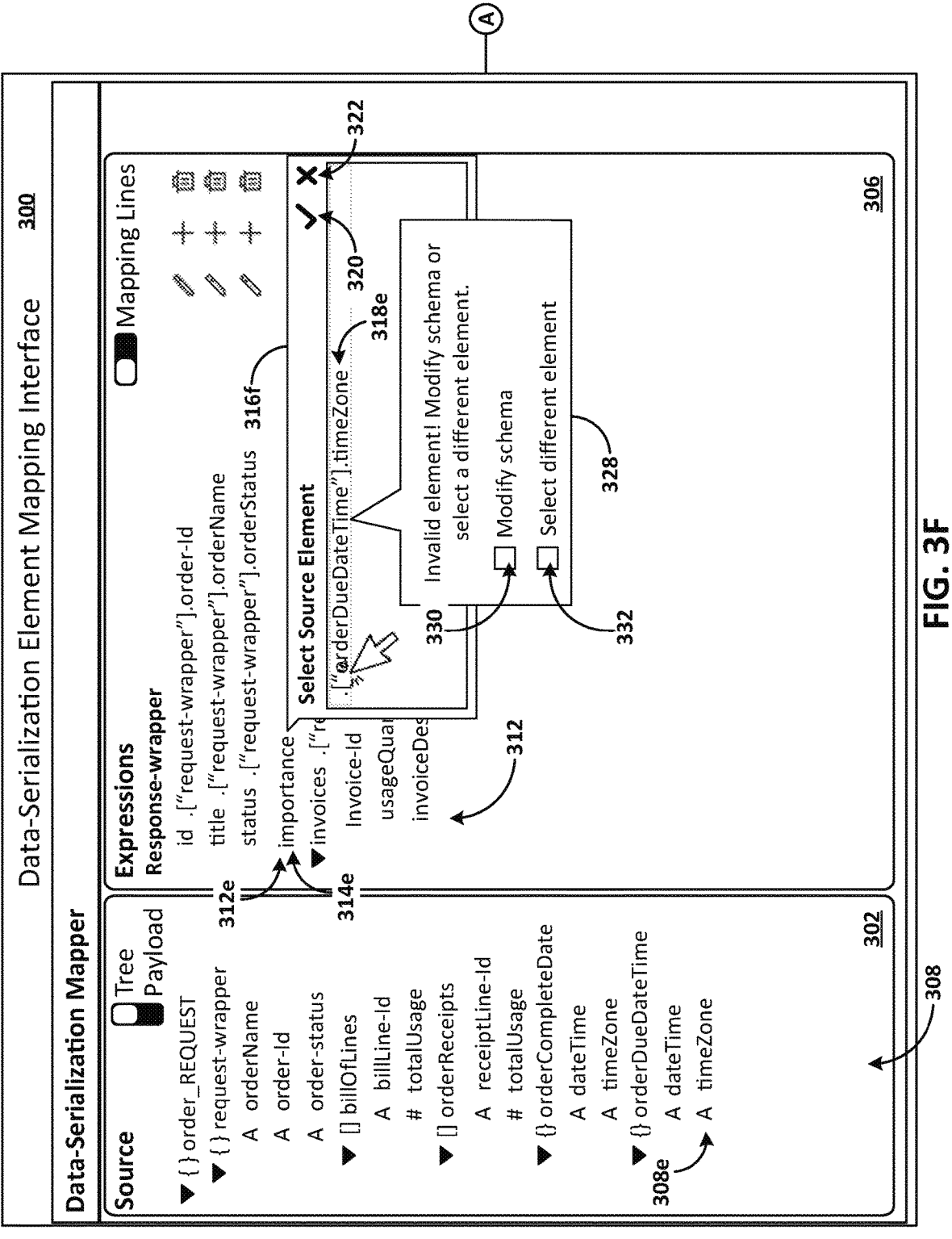

As shown in FIG. 3F, responsive to the user interactions with mapping selection element 316e to add a new destination data-serialization element, the destination region 304 may present destination data-serialization element 310e. A destination value field 330e of destination data-serialization element 310e may present a null value, for example, when the destination data-serialization element 310e is not yet mapped to a source data-serialization element. As further shown, the data-serialization element mapping interface 300 may present mapping selection element 316f for the user to select a source data-serialization element for inclusion in a mapping association with destination data-serialization element 310e.

As shown in FIG. 3F, the user may select source data-serialization element 308e, for example, by dragging and dropping source data-serialization element 308e into the mapping selection element 316f. The dragging and dropping of the source data-serialization element 308e may trigger generation of source mapping element 318e and presentation of source mapping element 318e in the mapping selection element 316f. In one example, as shown, the system may determine that the proposed mapping association between data-serialization element 308e and destination data-serialization element 310e is invalid. Responsive to determining that the mapping association is invalid, the system may refrain from generating a mapping expression representing the invalid proposed mapping association. Additionally, or in the alternative, responsive to the system determining that the proposed mapping association is invalid, the data-serialization element mapping interface 300 may present an invalid element alert 328 to indicate to the user that the proposed mapping association is invalid. The invalid element alert may present an option to modify schema for the data-serialization element by selecting a schema modification button 330, or to select a different data-serialization element by selecting an element selection button 332.

Figure 3G:
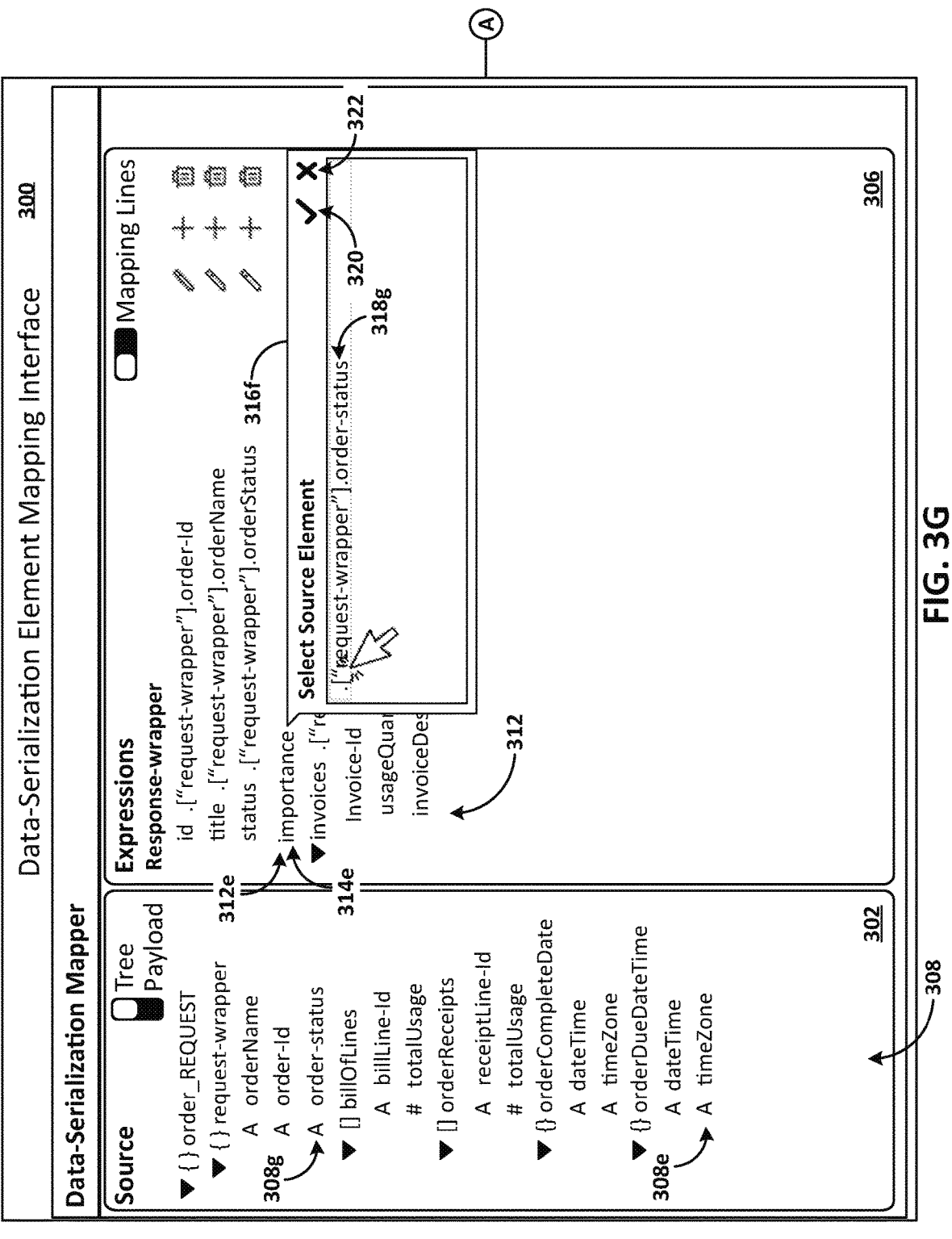
Figure 3G:
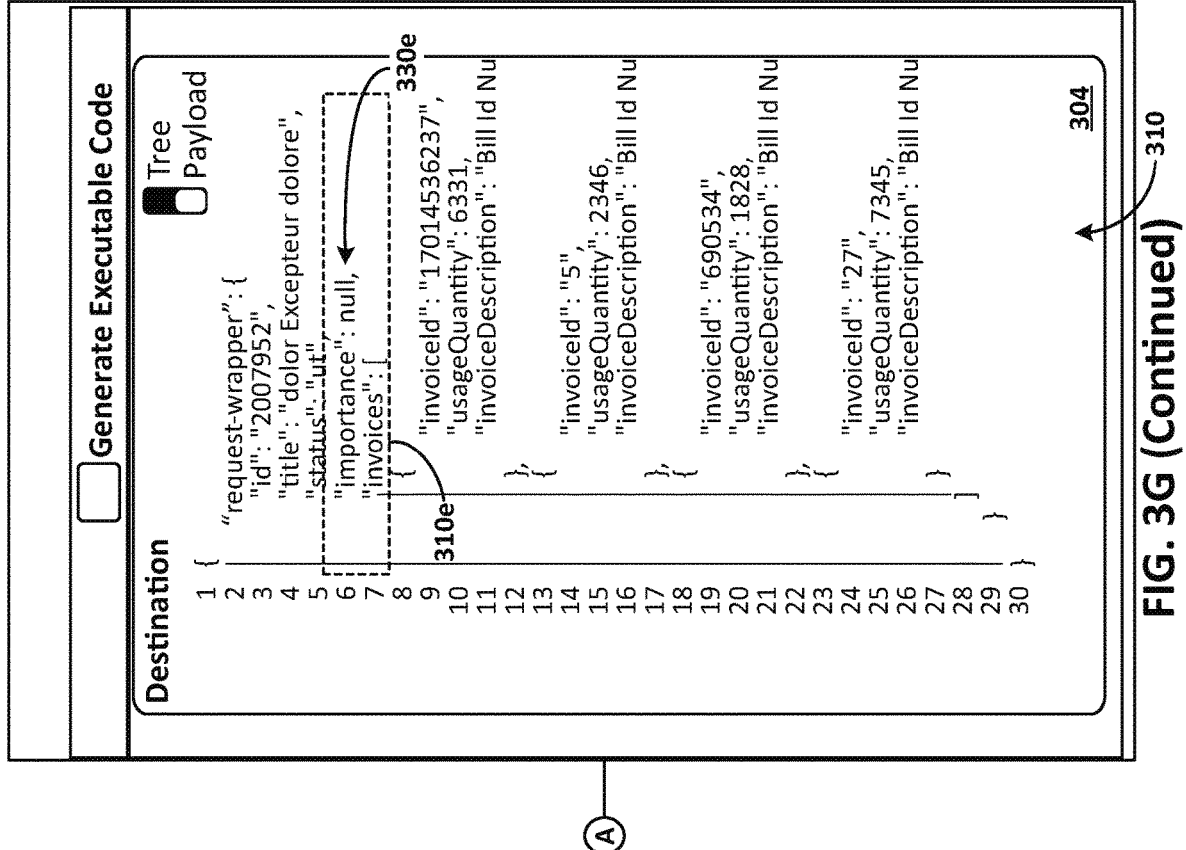

In one example, as shown in FIG. 3G, a user may select a different source data-serialization element, such as source data-serialization element 308g. The system may determine that the proposed mapping association between data-serialization element 308g and destination data-serialization element 310e is valid. The dragging and dropping of the source data-serialization element 308g, and/or the determination that the proposed mapping association is valid, may trigger generation of source mapping element 318g and presentation of the source mapping element 318g in the mapping selection element 316f. Responsive to determining that the proposed mapping association is valid, the system may generate a mapping expression representing the mapping association. Additionally, or in the alternative, the mapping expression may be generated responsive to the user selecting the accept button 320.

Figure 3H:
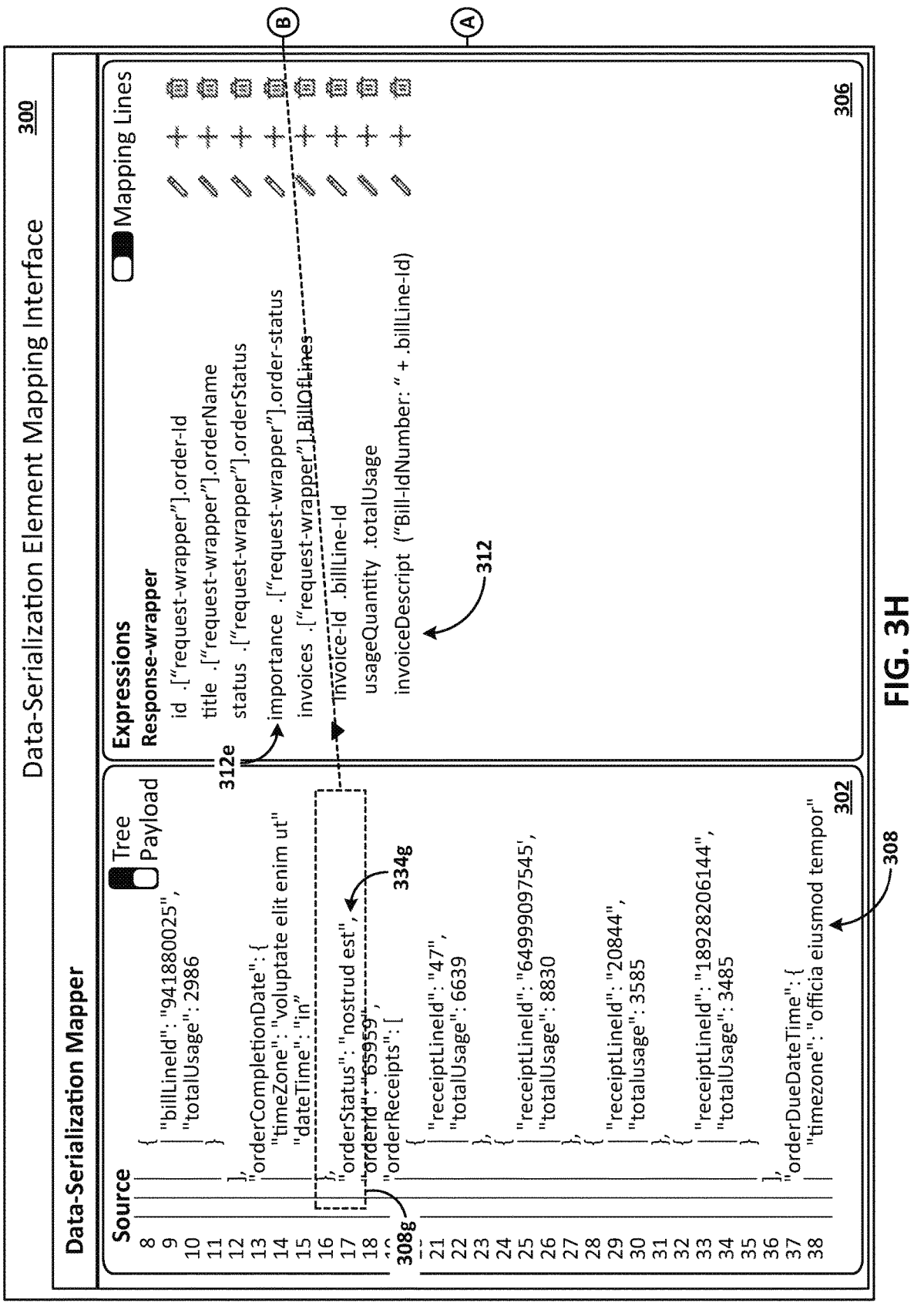
Figure 3H:
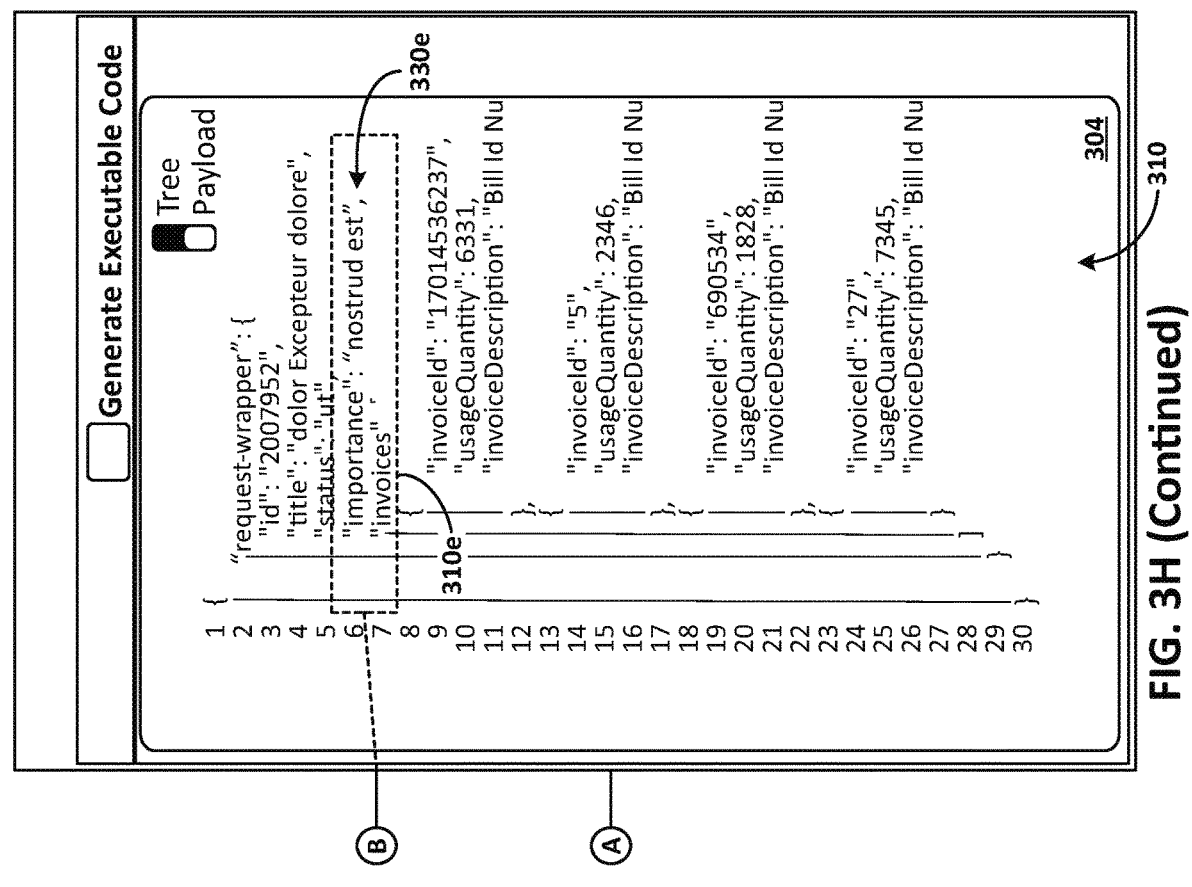

As shown in FIG. 3H, the data-serialization element mapping interface 300 may present the new destination data-serialization element 310e mapped to source data-serialization element 308g. As shown, as a result of the mapping expression represented by the mapping element 312e, the destination value field 330e of destination data-serialization element 310e may present a destination value that corresponds to a source value of the source value field 334g for the source data-serialization element 308g. For example, the system may update the null value presented in the destination value field 330e prior to generating the mapping expression with the destination value.

Figure 3I:
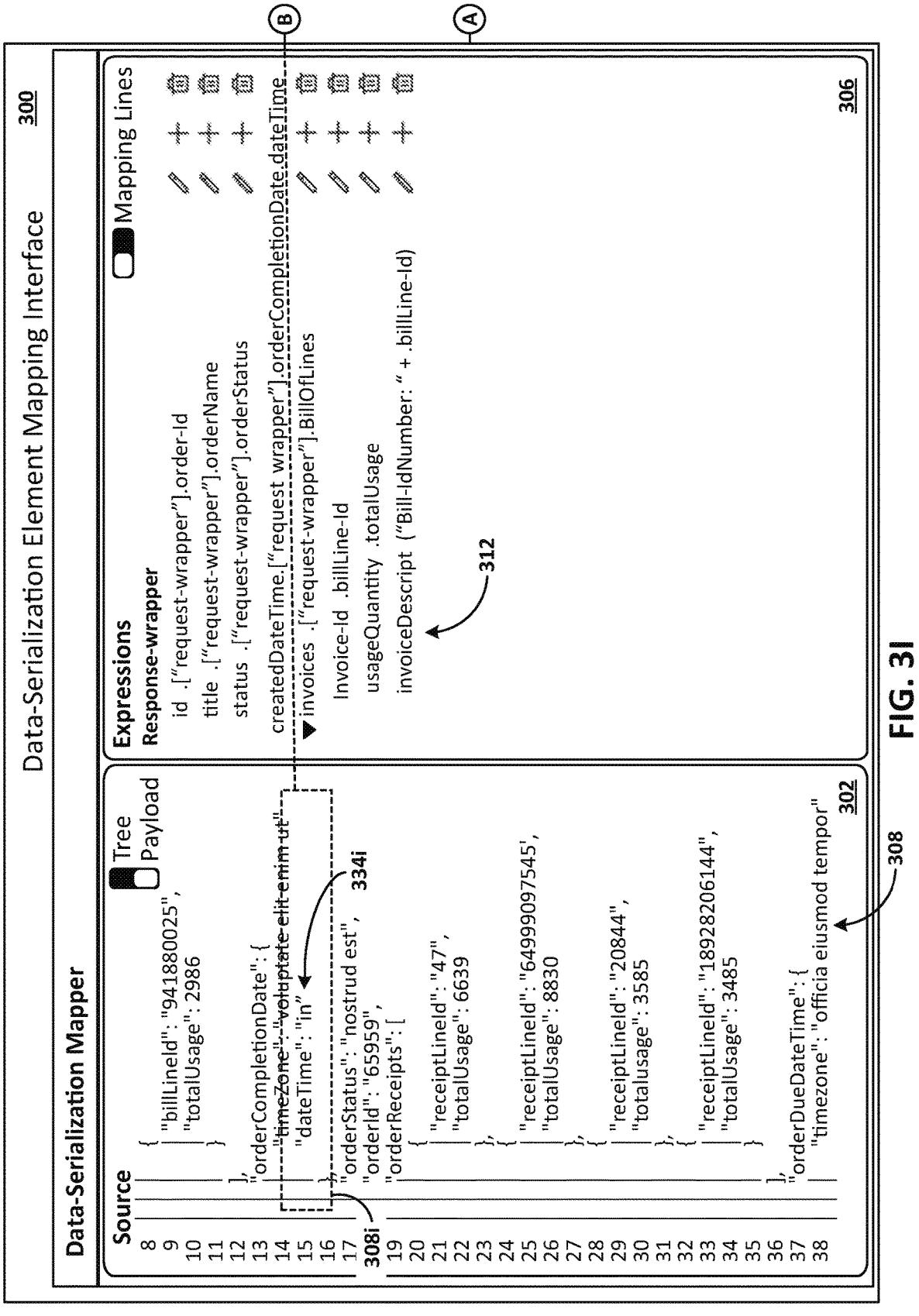
FIG. 3I illustrates example features of a data-serialization element mapping interface, including features associated with updating values for data-serialization elements, in accordance with one or more embodiments.
Figure 3I:
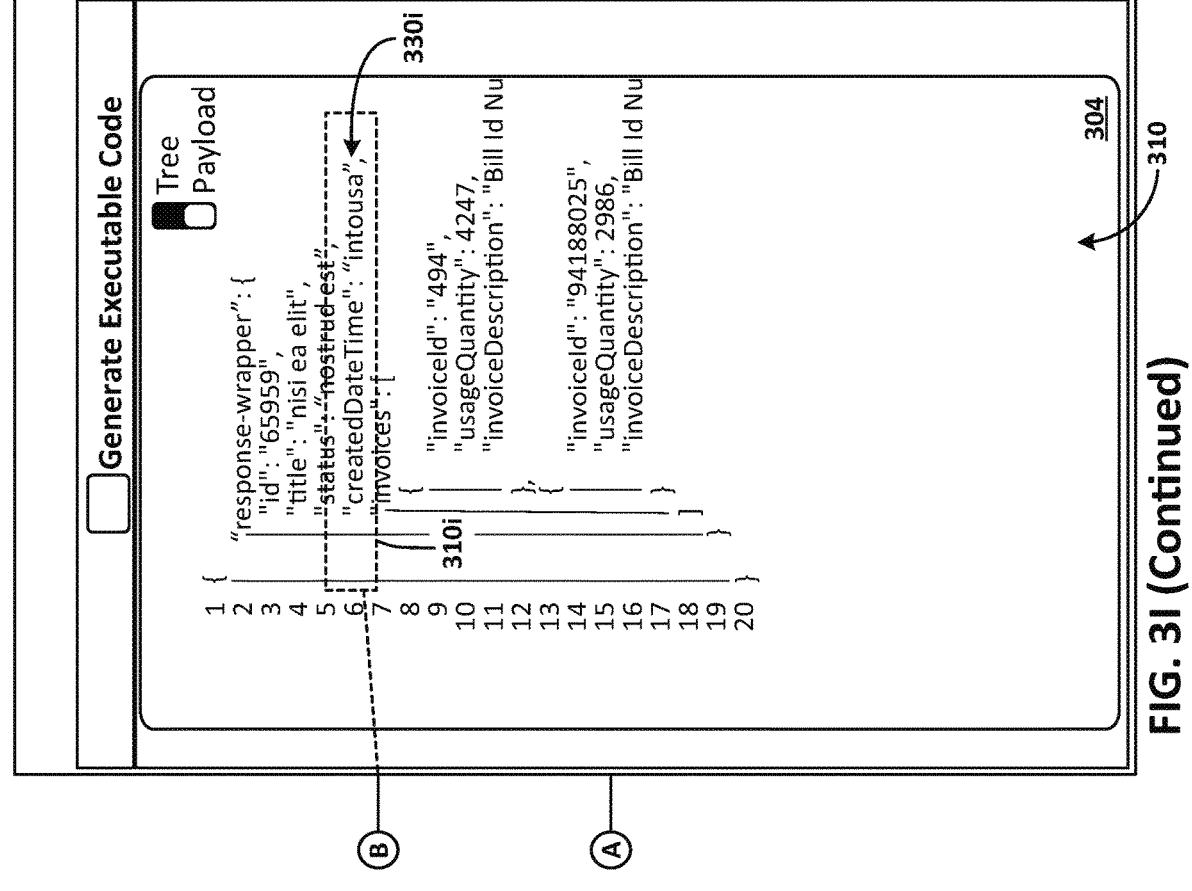

Referring now to FIG. 3I, example features of a data-serialization element mapping interface 300 may include features associated with updating values for data-serialization elements. As shown in FIG. 3I, source data-serialization element 308i may be mapped to destination data-serialization element 310i. A user may update or modify a source value of the source value field 334i corresponding to source data-serialization element 308i. The source region 302 may present the updated or modified source value. Responsive to the user updating or modifying the source value of source value field 334i, the destination region 304 may present a destination value of destination value field 330i for destination data-serialization element 310i being updated or modified. The system may present the update or modification to the destination value of destination value field 330i in the destination region 304 concurrently with, and responsive to, the update or modification to the source value of the source value field 334i.

5. Practical Applications, Advantages & Improvements

In various embodiments, the disclosed systems and methods may be utilized to transform payloads and/or data-serialization elements between a source computing system and a destination computing system. The disclosed systems and methods may be utilized to generate mapping expressions, and corresponding executable code that encodes the mapping expressions, in preparation for transferring sets of payloads from a source to a destination. For example, a set of source payloads that represent various customer specifications may be transferred to a supplier and the set of source payloads may be transformed to destination payloads that are compatible with the supplier's production system. Additionally, or in the alternative, the disclosed systems and methods may be utilized to generate mapping expressions, and corresponding executable code that encodes the mapping expressions, that may be utilized to transform data from a source to a destination as data becomes available. For example, source payloads that represent customer purchase orders may be transformed to a destination payload that represent supplier invoices, for example, as and when the purchase orders are generated.

The disclosed systems and methods provide improvements to technology associated with mapping data serialization elements or payloads between a source and a destination. For example, the disclosed user device interfaces allow users to generate and validate mapping associations between a source and a destination more expediently and accurately. Additionally, the disclosed systems and methods provide improvements to technology associated with transforming payloads from a source computing system to a destination computing system. For example, the mapping expressions, and corresponding executable code, may be utilized for batch transformation processes executed on sets of payloads, without needing to transform each individual payload. Additionally, or in the alternative, the mapping expressions, and corresponding executable code, may be generated and utilized on a recurring basis to allow source computing systems and destination computing systems that have different configuration to efficiently exchange structured data with one another.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
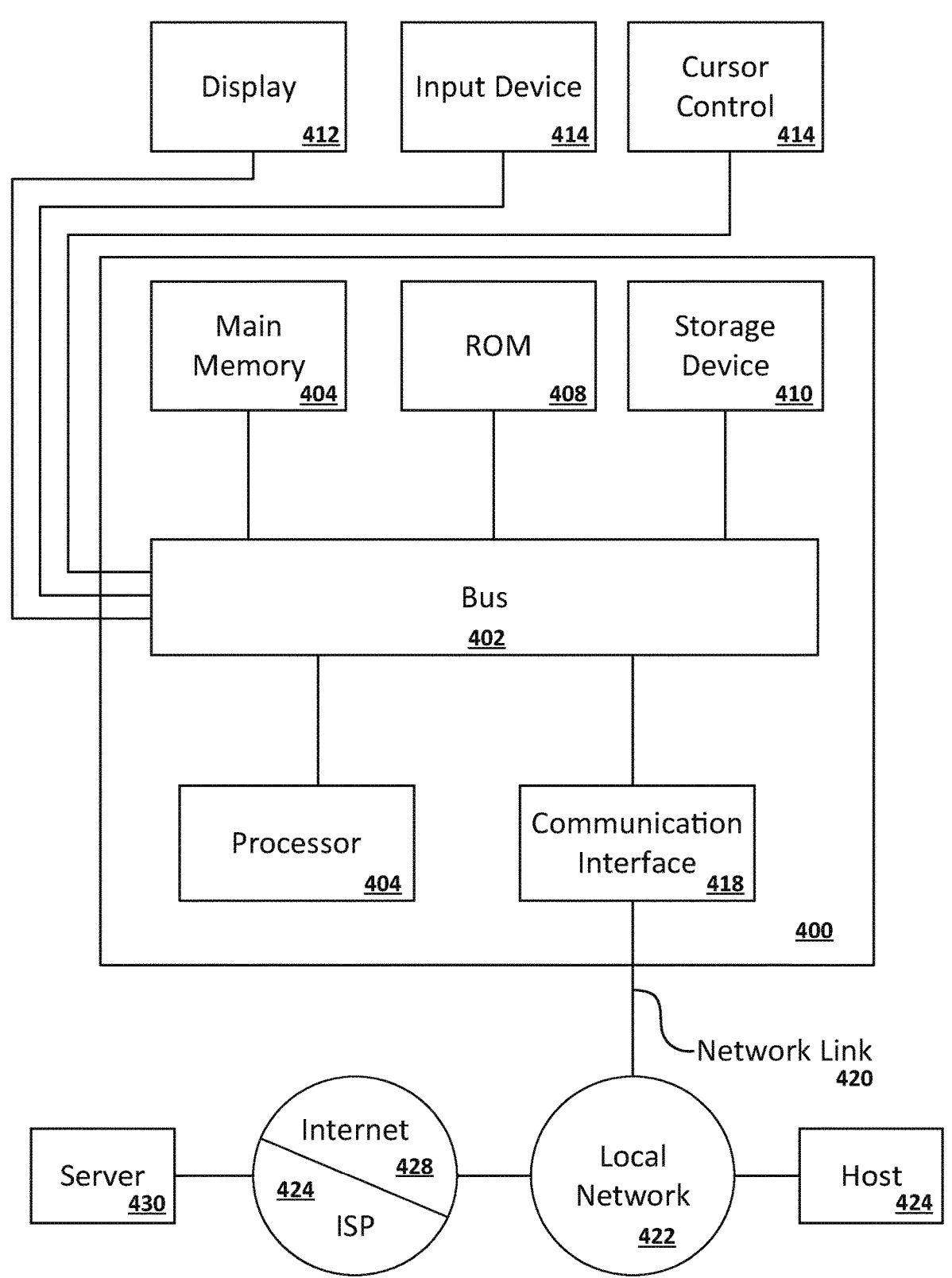
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Further aspects of the presently disclosed subject matter are provided by the following clauses:

A non-transitory computer readable medium comprising instructions which, when executed by one or more hardware processors, causes performance of operations comprising: concurrently displaying in a Graphical User Interface (GUI): a source region presenting a plurality of source data-serialization elements; a destination region presenting a plurality of destination data-serialization elements; receiving a user input associating a first destination data-serialization element, of the plurality of destination data-serialization elements, and a first source data-serialization element of the plurality of source data-serialization elements; responsive to receiving the user input: generating and storing a mapping expression that defines a first mapping association between the first source data-serialization element and the first destination data-serialization element; presenting in a mapping region of the GUI, a first mapping element representing the first mapping association between the first source data-serialization element and the first destination data-serialization element, wherein the mapping region is displayed in the GUI concurrently with the source region and the destination region.

A non-transitory computer readable medium comprising instructions which, when executed by one or more hardware processors, causes performance of operations comprising: displaying in a Graphical User Interface (GUI): a first region configured to present a plurality of first data-serialization elements, a second region configured to present a plurality of second data-serialization elements, a mapping region configured to present a set of mapping elements respectively corresponding to a set of mapping associations, wherein a mapping element of the set of mapping elements represents a mapping association between at least one of the plurality of first data-serialization elements and at least one of the plurality of second data-serialization elements, wherein the first region, the second region, and the mapping region are concurrently displayed in the GUI; receiving a first user input generating or identifying a first data-serialization element associated with a first serialized data corpus for inclusion in a first mapping association, of the set of mapping associations; responsive to receiving the first user input: presenting in the mapping region of the GUI, (a) a first mapping element representing the first mapping association including the first data-serialization element, and (b) a mapping selection element configured for identifying at least one data-serialization element associated with a second serialized data corpus for inclusion in the first mapping association.

The medium of any clause herein, wherein the operations further comprise: receiving a second user input generating or identifying a second data-serialization element associated with the second serialized data corpus for inclusion in the first mapping association; responsive to receiving the second user input: presenting in the second region, the second data-serialization element; presenting in the mapping region of the GUI, the second data-serialization element being included in the first mapping element and the first mapping element representing the first mapping association being between the first data-serialization element and the second data-serialization element; and generating and storing a first mapping expression that defines the first mapping association being between the first data-serialization element and the second data-serialization element.

The medium of any clause herein, wherein the operations further comprise: receiving a second user input identifying the first data-serialization element being copied as a second data-serialization element associated with the second serialized data corpus and the second data-serialization element being included in the first mapping association; responsive to receiving the second user input: presenting in the second region, the second data-serialization element as a copy of the first data-serialization element from the first region; presenting in the mapping region of the GUI, the second data-serialization element being included in the first mapping element and the first mapping element representing the first mapping association being between the first data-serialization element and the second data-serialization element; and generating and storing a first mapping expression that defines the first mapping association being between the first data-serialization element and the second data-serialization element.

The medium of any clause herein, wherein the first region is a source region, and the plurality of first data-serialization elements is a plurality of source data-serialization elements, and wherein the second region is a destination region, and the plurality of second data-serialization elements is a plurality of destination data-serialization elements; or wherein the first region is the destination region, and the plurality of first data-serialization elements is the plurality of destination data-serialization elements, and wherein the second region is the source region, and the plurality of second data-serialization elements is the plurality of source data-serialization elements.

The medium of any clause herein, wherein the plurality of source data-serialization elements comprise a source payload including a plurality of source values.

The medium of any clause herein, wherein the plurality of source data-serialization elements comprises a plurality of source schema corresponding to respective ones of a plurality of source containers, and wherein the source region presents the plurality of source schema, and wherein the plurality of source containers are excluded from being presentation in the source region.

The medium of any clause herein, wherein the operations further comprise: receiving a second user input identifying a second data-serialization element associated with the second serialized data corpus for inclusion in the first mapping association; responsive to receiving the second user input: presenting in the mapping region of the GUI, the second data-serialization element being included in the first mapping element and the first mapping element representing the first mapping association being between the first data-serialization element and the second data-serialization element; and generating and storing a first mapping expression that defines the first mapping association being between the first data-serialization element and the second data-serialization element.

The medium of any clause herein, wherein the first user input comprises dragging the first data-serialization element from the first region to the mapping region; and wherein the second user input comprises dragging the second data-serialization element from the second region to the mapping region.

The medium of any clause herein, wherein the first data-serialization element is a first schema and wherein the second data-serialization element is a second schema, wherein the first mapping expression defines the first mapping association between the first schema and the second schema; and wherein the operations further comprise: responsive to receiving the first user input: determining a first container, of the plurality of first data-serialization elements, having a first data structure defined by the first schema; and presenting in the mapping region of the GUI, a second mapping element representing a second mapping association including the first container; and responsive to receiving the second user input: determining a second container, of the plurality of second data-serialization elements, having a second data structure defined by the second schema, generating a second mapping expression that defines the second mapping association being between the first container and the second container, and presenting in the mapping region of the GUI, the second container being included in the second mapping element and the second mapping element representing the second mapping association between the first container and the second container.

The medium of any clause herein, wherein the first data-serialization element is a first container and wherein the second data-serialization element is a second container, wherein the first mapping expression defines the first mapping association between the first container and the second container; and wherein the operations further comprise: responsive to receiving the first user input: determining a first schema, of the plurality of first data-serialization elements, defining a first data structure of the first container; and presenting in the mapping region of the GUI, a second mapping element representing a second mapping association including the first schema; and responsive to receiving the second user input: determining a second schema, of the plurality of second data-serialization elements, defining a second data structure of the second container, generating a second mapping expression that defines the second mapping association being between the first schema and the second schema, and presenting in the mapping region of the GUI, the second schema being included in the second mapping element and the second mapping element representing the second mapping association between the first schema and the second schema.

A non-transitory computer readable medium comprising instructions which, when executed by one or more hardware processors, causes performance of operations comprising: concurrently displaying in a Graphical User Interface (GUI): a source region presenting a plurality of source data-serialization elements, a destination region presenting a plurality of destination data-serialization elements, and a mapping region presenting a set of mapping elements respectively corresponding to a set of mapping associations, wherein a mapping element of the set of mapping elements represents a mapping association between at least one of the plurality of source data-serialization elements and at least one of the plurality of destination data-serialization elements; receiving a first user input updating a first source value of a first source data-serialization element, of the plurality of source data-serialization elements, with a first updated source value of the first source data-serialization element; responsive to receiving the first user input: determining a first mapping expression that defines a first mapping association between the first source data-serialization element and a first destination data-serialization element, of the plurality of destination data-serialization elements; computing, based on the first mapping expression, a first updated destination value of the first destination data-serialization element; presenting in the source region of the GUI, the first source value being updated with the first updated source value; and presenting in the destination region of the GUI, a first destination value of the first destination data-serialization element being updated with the first updated destination value, wherein the first updated destination value is presented in the destination region of the GUI concurrently with the source region of the GUI presenting the first source value being updated with the first updated source value.

The medium of any clause herein, wherein the operations further comprise: receiving a second user input updating a second source value of a second source data-serialization element, of the plurality of source data-serialization elements, with a second updated source value of the second source data-serialization element; responsive to receiving the second user input: presenting in the source region of the GUI, the second source value being updated with the second updated source value, determining a second mapping expression that defines a second mapping association between the second source data-serialization element and a second destination data-serialization element, of the plurality of destination data-serialization elements, applying one or more mapping rules to the second mapping association between the second source data-serialization element and the second destination data-serialization element with the second mapping association reflecting the second source value having been updated to the second updated source value, and determining that the second mapping association satisfies the one or more mapping rules; and responsive to determining that the second mapping association satisfies the one or more mapping rules: computing, based on the second mapping expression, a second updated destination value of the second destination data-serialization element, and presenting in the destination region of the GUI, a second destination value of the second destination data-serialization element being updated with the second updated destination value, wherein the second updated destination value is presented in the destination region of the GUI concurrently with the source region of the GUI presenting the second source value being updated with the second updated source value.

The medium of any clause herein, wherein the one or more mapping rules prohibit mapping a source data-serialization object with a destination data-serialization object when the destination data-serialization object is incongruent with the source data-serialization object The medium of any clause herein, wherein the one or more mapping rules comprise at least one of: a first mapping rule that prohibits mapping of a source container with a destination container when the destination container is incongruent with the source container; a second mapping rule that prohibits mapping of a source schema with a destination schema when the destination schema is incongruent with the source schema; or a third mapping rule that prohibits mapping of a source container with a destination container when the destination container has a destination data structure defined by a destination schema that is incongruent with a source schema that defines a source data structure of the source container.

The medium of any clause herein, wherein the operations further comprise: receiving a third user input updating a third source value of a third source data-serialization element, of the plurality of source data-serialization elements, with a third updated source value of the third source data-serialization element; responsive to receiving the third user input: presenting in the source region of the GUI, the third source value being updated with the third updated source value, determining a third mapping expression that defines a third mapping association between the third source data-serialization element and a third destination data-serialization element, of the plurality of destination data-serialization elements, applying one or more mapping rules to the third mapping association between the third source data-serialization element and the third destination data-serialization element with the third mapping association reflecting the third source value having been updated to the third updated source value, and determining that the third mapping association fails at least one of the one or more mapping rules; and responsive to determining that the third mapping association fails at least one of the one or more mapping rules: presenting in the GUI, a mapping error object indicating that the third updated source value fails at least one of the one or more mapping rules.

The medium of any clause herein, wherein the first source data-serialization element is a first source schema and wherein the first destination data-serialization element is a first destination schema, wherein the first mapping expression defines the first mapping association between the first source schema and the first destination schema; and wherein the operations further comprise, responsive to receiving the first user input: determining a second mapping expression that defines a second mapping association between a first source container, of the plurality of source data-serialization elements, and a first destination container, of the plurality of destination data-serialization elements, wherein the first source container has a first data structure defined by the first source schema, wherein the first updated source value represents a first update to the first data structure, wherein the first destination container has a second data structure defined by the first destination schema, wherein the first updated destination value represents a second update to the second data structure; computing, based on the second mapping expression, a second updated destination value of the first destination container; determining, based on the first mapping expression, that the second updated destination value conforms to the first destination schema representing the second update to the second data structure; responsive to determining that the second updated destination value conforms to the first destination schema representing the second update to the second data structure; and presenting in the destination region of the GUI, a second destination value of the first destination container being updated with the second updated destination value, wherein the second updated destination value is presented in the destination region of the GUI concurrently with the source region of the GUI presenting the first source value being updated with the first updated source value.

The medium of any clause herein, wherein the first source data-serialization element is a first source container and wherein the first destination data-serialization element is a first destination container, wherein the first mapping expression defines the first mapping association between the first source container and the first destination container; and wherein the operations further comprise, responsive to receiving the first user input: determining a second mapping expression that defines a second mapping association between a first source schema, of the plurality of source data-serialization elements, and a first destination schema, of the plurality of destination data-serialization elements, wherein the first source schema defines a first data structure of the first source container, wherein the first updated source value represents a first update to a source value field of the first source container, wherein the first destination schema defines a second data structure of the first destination container, wherein the first updated destination value represents a second update to a destination value field of the first destination container; computing, based on the second mapping expression, a second updated destination value of the first destination schema; and determining, based on the second mapping expression, that the first updated destination value conforms to the second data structure defined by the first destination schema; presenting in the destination region of the GUI, a second destination value of the first destination schema being updated with the second updated destination value, wherein the second updated destination value is presented in the destination region of the GUI concurrently with the source region of the GUI presenting the first source value being updated with the first updated source value.

A method, comprising performing the operations of any clause herein, wherein the method is performed using at least one hardware device.

A system comprising at least one hardware device, wherein the system is configured to execute the operations of any clause herein using the at least one hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:

concurrently displaying in a Graphical User Interface (GUI):

a source region presenting a plurality of source data-serialization elements, a destination region presenting a plurality of destination data-serialization elements, and a mapping region;

receiving a user input comprising a first association between a first destination data-serialization element, of the plurality of destination data-serialization elements, and a first source data-serialization element of the plurality of source data-serialization elements;

responsive to receiving the user input:

validating the first association between the first destination data-serialization element and the first source data-serialization element based on one or more mapping rules;

responsive to successfully validating the first association based on the one or more mapping rules:

generating and storing a mapping expression that defines a first mapping association between the first source data-serialization element and the first destination data-serialization element;

presenting, in the mapping region of the GUI, a first mapping element representing the first mapping association between the first source data-serialization element and the first destination data-serialization element, wherein the first mapping element comprises a first textual element representing the first source data-serialization element and a second textual element representing the first destination data-serialization element.

2. The media of claim 1, wherein the operations further comprise:

determining a source hierarchy among a first set of elements of the plurality of source data-serialization elements, and presenting the first set of elements in the source region according to the source hierarchy; or determining a destination hierarchy among a second set of elements of the plurality of destination data-serialization elements, and presenting the second set of elements in the destination region according to the destination hierarchy.

3. The media of claim 2, wherein the operations comprise determining the source hierarchy, wherein determining the source hierarchy comprises:

identifying, from among the plurality of source data-serialization elements, at least one of: a parent source data-serialization element corresponding to the first source data-serialization element, or a child source data-serialization element corresponding to the first source data-serialization element; and wherein generating the mapping expression comprises defining an association between the first destination data-serialization element and the at least one of the parent source data-serialization element or the child source data-serialization element corresponding to the first source data-serialization element.

4. The media of claim 2, wherein the operations comprise determining the destination hierarchy, wherein determining the destination hierarchy comprises:

identifying, from among the plurality of destination data-serialization elements, at least one of: a parent destination data-serialization element corresponding to the first destination data-serialization element, or a child destination data-serialization element corresponding to the first destination data-serialization element; and wherein generating the mapping expression comprises defining an association between the first source data-serialization element and the at least one of the parent destination data-serialization element or the child destination data-serialization element corresponding to the first destination data-serialization element.

5. The media of claim 1, wherein the operations further comprise:

responsive to receiving the user input, generating an independently executable code that encodes the mapping expression.

6. The media of claim 5, wherein the first source data-serialization element comprises a source container element having a source value field and a source value occupying the source value field;

wherein the first destination data-serialization element comprises a destination container element having a destination value field; and wherein generating the independently executable code comprises:

generating an executable instruction configured to generate a copy of the source value and populate the destination value field with the copy of the source value, wherein upon executing the executable instruction, the destination container element comprises the copy of the source value occupying the destination value field.

7. The media of claim 5, wherein the plurality of source data-serialization elements comprises at least one source container element having a source value field and a source value occupying the source value field, and wherein the first source data-serialization element is associated with a source schema element defining a source structure for the source value field;

wherein the plurality of destination data-serialization elements comprises a destination container element having a destination value field, and wherein the first destination data-serialization element is associated with a destination schema element defining a destination structure for the destination value field, wherein the destination schema element differs from the source schema element;

wherein generating the independently executable code comprises:

generating an executable instruction that is configured to (a) generate a copy of the source value, (b) transform the copy of the source value based on the destination schema element, and (c) populate the destination value field with the copy of the source value, wherein upon executing the executable instruction, the destination container element comprises the copy of the source value occupying the destination value field and conforming to the destination schema element.

8. The media of claim 5, wherein the plurality of source data-serialization elements comprises at least one source container element having a source value field and a source value occupying the source value field, and wherein the first source data-serialization element is associated with a source schema element defining a source structure for the source value field;

wherein the plurality of destination data-serialization elements comprises a destination container element having a destination value field, and wherein the first destination data-serialization element is associated with a destination schema element defining a destination structure for the destination value field, wherein the destination schema element differs from the source schema element;

wherein generating the independently executable code comprises:

generating an executable instruction that is configured to (a) generate an additional destination schema element corresponding to the source schema element, (b) assign the additional destination schema element to the destination container element, (c) generate a copy of the source value, and (d) populate the destination value field with the copy of the source value, wherein upon executing the executable instruction, the destination container element is associated with the additional destination schema element defining the destination structure for the destination value field, and the copy of the source value conforming to the additional destination schema element occupies the destination value field.

9. The media of claim 1, wherein the operations further comprise:

receiving a second user input indicating a second proposed mapping of a second destination data-serialization element, of the plurality of destination data-serialization elements, with a second source data-serialization element of the plurality of source data-serialization elements;

responsive to receiving the second user input:

determining that the second proposed mapping satisfies one or more mapping rules; and responsive to determining that the second proposed mapping satisfies the one or more mapping rules:

generating and storing a second mapping expression that defines a second mapping association between the second destination data-serialization element and the second source data-serialization element; and presenting, in the mapping region of the GUI, a second mapping element representing the second mapping association between the second destination data-serialization element and the second source data-serialization element.

10. The media of claim 9, wherein the one or more mapping rules comprise at least one of:

a first mapping rule that prohibits mapping of a source container element with a destination container element when the destination container element is incongruent with the source container element;

a second mapping rule that prohibits mapping of a source schema element with a destination schema element when the destination schema element is incongruent with the source schema element; or a third mapping rule that prohibits mapping of a source container element with a destination container element when the destination container element has a destination data structure defined by a destination schema element that is incongruent with a source schema element that defines a source data structure of the source container element.

11. The media of claim 1, wherein the operations further comprise:

receiving a second user input indicating a second proposed mapping of a second destination data-serialization element, of the plurality of destination data-serialization elements, with a second source data-serialization element of the plurality of source data-serialization elements;

responsive to receiving the second user input:

determining that the second proposed mapping fails at least one of one or more mapping rules; and responsive to determining that the second proposed mapping fails at least one of the one or more mapping rules:

presenting in the GUI, a mapping error object indicating that the second proposed mapping fails at least one of the one or more mapping rules.

12. The media of claim 1, wherein the operations further comprise:

presenting in the GUI, at least one of:

a source mapping line between the first source data-serialization element and the first mapping element, and a destination mapping line between the first mapping element and the first destination data-serialization element; or a mapping line between the first source data-serialization element and the first destination data-serialization element.

13. The media of claim 1, wherein the plurality of source data-serialization elements comprises at least one of: a source schema element or a source object element; or wherein the plurality of destination data-serialization elements comprise at least one of: a destination schema element or a destination object element.

14. The media of claim 1, wherein the first source data-serialization element is a first source schema element and wherein the first destination data-serialization element is a first destination schema element, wherein the first mapping association is between the first source schema element and the first destination schema element; and wherein the operations further comprise, responsive to receiving the user input:

determining a first source container element, of the plurality of source data-serialization elements, having a first data structure defined by the first source schema element;

determining a first destination container element, of the plurality of destination data-serialization elements, having a second data structure defined by the first destination schema element;

generating a second mapping expression that defines a second mapping association between the first source container element and the first destination container element; and presenting in the mapping region of the GUI, a second mapping element representing the second mapping association between the first source container element and the first destination container element.

15. The media of claim 1, wherein the first source data-serialization element is a first source container element and wherein the first destination data-serialization element is a first destination container element, wherein the first mapping association is between the first source container element and the first destination container element; and wherein the operations further comprise, responsive to receiving the user input:

determining a first source schema element, of the plurality of source data-serialization elements, defining a first data structure of the first source container element;

determining a first destination schema element, of the plurality of destination data-serialization elements, defining a second data structure of the first destination container element;

generating a second mapping expression that defines a second mapping association between the first source schema element and the first destination schema element; and presenting in the mapping region of the GUI, a second mapping element representing the second mapping association between the first source schema element and the first destination schema element.

16. A method, comprising:

concurrently displaying in a Graphical User Interface (GUI):

a source region presenting a plurality of source data-serialization elements, a destination region presenting a plurality of destination data-serialization elements, and a mapping region;

receiving a user input comprising a first association between a first destination data-serialization element, of the plurality of destination data-serialization elements, and a first source data-serialization element of the plurality of source data-serialization elements;

responsive to receiving the user input:

validating the first association between the first destination data-serialization element and the first source data-serialization element based on one or more mapping rules;

responsive to successfully validating the first association based on the one or more mapping rules:

generating and storing a mapping expression that defines a first mapping association between the first source data-serialization element and the first destination data-serialization element;

presenting, in the mapping region of the GUI, a first mapping element representing the first mapping association between the first source data-serialization element and the first destination data-serialization element, wherein the first mapping element comprises a first textual element representing the first source data-serialization element and a second textual element representing the first destination data-serialization element;

wherein the method is performed using at least one hardware device.

17. The method of claim 16, further comprising:

determining a source hierarchy among a first set of elements of the plurality of source data-serialization elements, and presenting the first set of elements in the source region according to the source hierarchy; or determining a destination hierarchy among a second set of elements of the plurality of destination data-serialization elements, and presenting the second set of elements in the destination region according to the destination hierarchy.

18. The method of claim 17, comprising determining the source hierarchy, wherein determining the source hierarchy comprises:

identifying, from among the plurality of source data-serialization elements, at least one of: a parent source data-serialization element corresponding to the first source data-serialization element, or a child source data-serialization element corresponding to the first source data-serialization element; and wherein generating the mapping expression comprises defining an association between the first destination data-serialization element and the at least one of the parent source data-serialization element or the child source data-serialization element corresponding to the first source data-serialization element.

19. The method of claim 17, comprising determining the destination hierarchy, wherein determining the destination hierarchy comprises:

identifying, from among the plurality of destination data-serialization elements, at least one of: a parent destination data-serialization element corresponding to the first destination data-serialization element, or a child destination data-serialization element corresponding to the first destination data-serialization element; and wherein generating the mapping expression comprises defining an association between the first source data-serialization element and the at least one of the parent destination data-serialization element or the child destination data-serialization element corresponding to the first destination data-serialization element.

20. The method of claim 16, further comprising:

responsive to receiving the user input, generating an independently executable code that encodes the mapping expression;

wherein the first source data-serialization element comprises a source container element having a source value field and a source value occupying the source value field;

wherein the first destination data-serialization element comprises a destination container element having a destination value field; and wherein generating the independently executable code comprises:

generating an executable instruction configured to generate a copy of the source value and populate the destination value field with the copy of the source value, wherein upon executing the executable instruction, the destination container element comprises the copy of the source value occupying the destination value field.

21. The method of claim 16, further comprising:

responsive to receiving the user input, generating an independently executable code that encodes the mapping expression;

wherein the plurality of source data-serialization elements comprises at least one source container element having a source value field and a source value occupying the source value field, and wherein the first source data-serialization element is associated with a source schema element defining a source structure for the source value field;

wherein the plurality of destination data-serialization elements comprises a destination container element having a destination value field, and wherein the first destination data-serialization element is associated with a destination schema element defining a destination structure for the destination value field, wherein the destination schema element differs from the source schema element;

wherein generating the independently executable code comprises:

generating an executable instruction that is configured to (a) generate a copy of the source value, (b) transform the copy of the source value based on the destination schema element, and (c) populate the destination value field with the copy of the source value, wherein upon executing the executable instruction, the destination container element comprises the copy of the source value occupying the destination value field and conforming to the destination schema element.

22. The method of claim 16, further comprising:

responsive to receiving the user input, generating an independently executable code that encodes the mapping expression;

wherein the plurality of source data-serialization elements comprises at least one source container element having a source value field and a source value occupying the source value field, and wherein the first source data-serialization element is associated with a source schema element defining a source structure for the source value field;

wherein the plurality of destination data-serialization elements comprises a destination container element having a destination value field, and wherein the first destination data-serialization element is associated with a destination schema element defining a destination structure for the destination value field, wherein the destination schema element differs from the source schema element;

wherein generating the independently executable code comprises:

generating an executable instruction that is configured to (a) generate an additional destination schema element corresponding to the source schema element, (b) assign the additional destination schema element to the destination container element, (c) generate a copy of the source value, and (d) populate the destination value field with the copy of the source value, wherein upon executing the executable instruction, the destination container element is associated with the additional destination schema element defining the destination structure for the destination value field, and the copy of the source value conforming to the additional destination schema element occupies occupying the destination value field.

23. The method of claim 16, further comprising:

receiving a second user input indicating a second proposed mapping of a second destination data-serialization element, of the plurality of destination data-serialization elements, with a second source data-serialization element of the plurality of source data-serialization elements;

responsive to receiving the second user input:

determining that the second proposed mapping satisfies one or more mapping rules; and responsive to determining that the second proposed mapping satisfies the one or more mapping rules:

generating and storing a second mapping expression that defines a second mapping association between the second destination data-serialization element and the second source data-serialization element; and presenting, in the mapping region of the GUI, a second mapping element representing the second mapping association between the second destination data-serialization element and the second source data-serialization element.

24. The method of claim 23, wherein the one or more mapping rules comprise at least one of:

a first mapping rule that prohibits mapping of a source container element with a destination container element when the destination container element is incongruent with the source container element;

a second mapping rule that prohibits mapping of a source schema element with a destination schema element when the destination schema element is incongruent with the source schema element; or a third mapping rule that prohibits mapping of a source container element with a destination container element when the destination container element has a destination data structure defined by a destination schema element that is incongruent with a source schema element that defines a source data structure of the source container element.

25. The method of claim 16, further comprising:

receiving a second user input indicating a third proposed mapping of a third destination data-serialization element, of the plurality of destination data-serialization elements, with a third source data-serialization element of the plurality of source data-serialization elements;

responsive to receiving the second user input:

determining that the third proposed mapping fails at least one of one or more mapping rules; and responsive to determining that the third proposed mapping fails at least one of the one or more mapping rules:

presenting in the GUI, a mapping error object indicating that the third proposed mapping fails at least one of the one or more mapping rules.

26. The method of claim 16, further comprising:

presenting in the GUI, at least one of:

a source mapping line between the first source data-serialization element and the first mapping element, and a destination mapping line between the first mapping element and the first destination data-serialization element; or a mapping line between the first source data-serialization element and the first destination data-serialization element.

27. The method of claim 16, wherein the plurality of source data-serialization elements comprises at least one of: a source schema element or a source object element; or wherein the plurality of destination data-serialization elements comprises at least one of: a destination schema element or a destination object element.

28. The method of claim 16, wherein the first source data-serialization element is a first source schema element and wherein the first destination data-serialization element is a first destination schema element, wherein the first mapping association is between the first source schema element and the first destination schema element; and wherein the method further comprises, responsive to receiving the user input:

determining a first source container element, of the plurality of source data-serialization elements, having a first data structure defined by the first source schema element;

determining a first destination container element, of the plurality of destination data-serialization elements, having a second data structure defined by the first destination schema element;

generating a second mapping expression that defines a second mapping association between the first source container element and the first destination container element; and presenting in the mapping region of the GUI, a second mapping element representing the second mapping association between the first source container element and the first destination container element.

29. The method of claim 16, wherein the first source data-serialization element is a first source container element and wherein the first destination data-serialization element is a first destination container element, wherein the first mapping association is between the first source container element and the first destination container element; and wherein the method further comprises, responsive to receiving the user input:

determining a first source schema element, of the plurality of source data-serialization elements, defining a first data structure of the first source container element;

determining a first destination schema element, of the plurality of destination data-serialization elements, defining a second data structure of the first destination container element;

generating a second mapping expression that defines a second mapping association between the first source schema element and the first destination schema element; and presenting in the mapping region of the GUI, a second mapping element representing the second mapping association between the first source schema element and the first destination schema element.

30. A system, comprising:

at least one hardware processor;

the system being configured to execute operations, using the at least one hardware processor, the operations comprising:

concurrently displaying in a Graphical User Interface (GUI):

a source region presenting a plurality of source data-serialization elements, a destination region presenting a plurality of destination data-serialization elements, and a mapping region;

receiving a user input comprising a first association between a first destination data-serialization element, of the plurality of destination data-serialization elements, and a first source data-serialization element of the plurality of source data-serialization elements;

responsive to receiving the user input:

validating the first association between the first destination data-serialization element and the first source data-serialization element based on one or more mapping rules;

responsive to successfully validating the first association based on the one or more mapping rules:

generating and storing a mapping expression that defines a first mapping association between the first source data-serialization element and the first destination data-serialization element;

presenting, in the mapping region of the GUI, a first mapping element representing the first mapping association between the first source data-serialization element and the first destination data-serialization element, wherein the first mapping element comprises a first textual element representing the first source data-serialization element and a second textual element representing the first destination data-serialization element.

31. The system of claim 30, wherein receiving the user input comprises:

receiving a first selection indicative of the first destination data-serialization element being selected from the plurality of destination data-serialization elements; and receiving a second selection indicative of the first source data-serialization element being selected from the plurality of source data-serialization elements.

32. The system of claim 30, wherein the operations further comprise:

generating a copy of a source value occupying a source value field of the first source data-serialization element;

transforming the copy of the source value based on a destination schema element comprising a destination structure of a destination value field of the first destination data-serialization element; and populating the destination value field of the first destination data-serialization element with the copy of the source value.

33. The system of claim 30, wherein the operations further comprise:

receiving a first selection indicative of a second destination data-serialization element being selected from the plurality of destination data-serialization elements;

responsive to receiving the first selection:

generating and storing a second mapping expression that defines a second mapping association between the second destination data-serialization element and a second source data-serialization element.

34. The system of claim 33, wherein generating and storing the second mapping expression comprises:

determining, based on the second destination data-serialization element, that the second destination data-serialization element corresponds to the second source data-serialization element; and based on determining that the second destination data-serialization element corresponds to the second source data-serialization element, generating and storing the second mapping expression.

35. The system of claim 33, wherein the operations further comprise:

further responsive to receiving the first selection:

generating and storing a third mapping expression that defines a third mapping association between the second source data-serialization element and a third destination data-serialization element.

36. The system of claim 33, wherein the operations further comprise:

further responsive to receiving the first selection:

identifying a third destination data-serialization element for inclusion in the second mapping expression, wherein generating and storing the second mapping expression comprises defining a third mapping association between the second source data-serialization element and the third destination data-serialization element.

37. The system of claim 30, wherein validating the first association between the first destination data-serialization element and the first source data-serialization element comprises:

determining that the first association between the first destination data-serialization element and the first source data-serialization element satisfies one or more mapping rules;

wherein the one or more mapping rules comprise at least one of:

a first mapping rule that prohibits associating a source container element with a destination container element when the destination container element is incongruent with the source container element;

a second mapping rule that prohibits associating a source schema element with a destination schema element when the destination schema element is incongruent with the source schema element; or a third mapping rule that prohibits associating a source container element with a destination container element when the destination container element has a destination data structure defined by a destination schema element that is incongruent with a source schema element that defines a source data structure of the source container element.

38. The system of claim 30, wherein the user input associating the first destination data-serialization element and the first source data-serialization element comprises at least one of:

dragging and dropping the first source data-serialization element from the source region of the GUI to the mapping region of the GUI; or dragging and dropping the first destination data-serialization element from the destination region of the GUI to the mapping region of the GUI.

39. The system of claim 38, dragging and dropping the first source data-serialization element from the source region of the GUI to the mapping region of the GUI comprises:

dragging and dropping a parent data-serialization element from the source region of the GUI to the mapping region of the GUI;

responsive to dragging and dropping the parent data-serialization element from the source region of the GUI to the mapping region of the GUI:

including a child data-serialization element, of the parent data-serialization element, in the mapping region of the GUI.

40. The system of claim 38, dragging and dropping the first destination data-serialization element from the source region of the GUI to the mapping region of the GUI comprises:

dragging and dropping a child data-serialization element from the destination region of the GUI to the mapping region of the GUI;

responsive to dragging and dropping the child data-serialization element from the destination region of the GUI to the mapping region of the GUI:

including a parent data-serialization element, of the child data-serialization element, in the mapping region of the GUI.

41. The system of claim 30, wherein the operations further comprise:

displaying in the GUI, a mapping selection element for identifying at least one data-serialization element for inclusion in the mapping expression;

receiving, via the mapping selection element, the at least one data-serialization element.

42. The system of claim 41, wherein the user input associating the first destination data-serialization element and the first source data-serialization element comprises:

dragging and dropping the first source data-serialization element from the source region of the GUI to the mapping region of the GUI; and wherein the operations further comprise:

displaying the mapping selection element in the GUI responsive to the user input comprising dragging and dropping the first source data-serialization element from the source region of the GUI to the mapping region of the GUI;

wherein the user input associating the first destination data-serialization element and the first source data-serialization element further comprises:

selecting the first destination data-serialization element from the mapping selection element.

43. The system of claim 41, wherein the user input associating the first destination data-serialization element and the first source data-serialization element comprises:

dragging and dropping the first destination data-serialization element from the destination region of the GUI to the mapping region of the GUI; and wherein the operations further comprise:

displaying the mapping selection element in the GUI responsive to the user input comprising dragging and dropping the first destination data-serialization element from the destination region of the GUI to the mapping region of the GUI;

wherein the user input associating the first destination data-serialization element and the first source data-serialization element further comprises:

selecting the first source data-serialization element from the mapping selection element.

44. The system of claim 30, wherein the operations further comprise:

displaying in the GUI, a mapping selection element comprising a first association between the first destination data-serialization element and the first source data-serialization element;

receiving, via the mapping selection element, an accept input indicative of a user accepting the first association between the first destination data-serialization element and the first source data-serialization element;

generating and storing the mapping expression responsive to receiving the accept input.

\* \* \* \* \*